(12) United States Patent
Lee et al.

(10) Patent No.: US 11,695,340 B2
(45) Date of Patent: Jul. 4, 2023

(54) ELECTRONIC DEVICE PERFORMING DIRECT VOLTAGE TO DIRECT VOLTAGE CONVERSION CONVERTING AN INPUT VOLTAGE TO A FIXED OUTPUT VOLTAGE AND OPERATING METHOD OF ELECTRONIC DEVICE

(71) Applicant: Samsung Electronics Co., Ltd., Suwon-si (KR)

(72) Inventors: Kwang Chan Lee, Hwaseong-si (KR); Dongho Shin, Hwaseong-si (KR); Chang Seok Chae, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 79 days.

(21) Appl. No.: 17/332,436

(22) Filed: May 27, 2021

(65) Prior Publication Data
US 2022/0103072 A1     Mar. 31, 2022

(30) Foreign Application Priority Data
Sep. 28, 2020  (KR) ......................... 10-2020-0125623

(51) Int. Cl.
*H02M 3/158*     (2006.01)
(52) U.S. Cl.
CPC ................... *H02M 3/1582* (2013.01)
(58) Field of Classification Search
CPC .. H02M 3/1582; H02M 3/156; H02M 1/0032; H02M 1/08; H02M 1/0006; Y02B 70/10; H02J 2207/20
See application file for complete search history.

(56) References Cited

U.S. PATENT DOCUMENTS

| | | | |
|---|---|---|---|
| 8,773,084 B2 | 7/2014 | Casey et al. | |
| 9,614,443 B2 | 4/2017 | Kay et al. | |
| 9,973,090 B1 | 5/2018 | Lau | |
| 10,090,762 B2 | 10/2018 | Adeeb et al. | |
| 10,243,463 B2 | 3/2019 | Sun et al. | |
| 10,250,141 B2 | 4/2019 | Zhang | |
| 2012/0001610 A1* | 1/2012 | Klein | H02M 3/1582 323/284 |

(Continued)

FOREIGN PATENT DOCUMENTS

JP     2019106509 A  *  6/2019
KR        101893287 B1     8/2018

*Primary Examiner* — Kyle J Moody
*Assistant Examiner* — Jye-June Lee
(74) *Attorney, Agent, or Firm* — Harness, Dickey & Pierce, P.L.C.

(57) ABSTRACT

Disclosed is an electronic device, which includes a direct voltage to direct voltage converter, and a controller that receives first current information, second current information, an input voltage, and a feedback voltage from the direct voltage to direct voltage converter, controls the direct voltage to direct voltage converter based on the input voltage in one of a first mode, a second mode, or a third mode, controls the direct voltage to direct voltage converter based on the first current information and an output voltage such that buck conversion is performed in the first mode and the second mode, and controls the direct voltage to direct voltage converter based on the second current information and the output voltage such that boost conversion is performed in the second mode and the third mode.

19 Claims, 16 Drawing Sheets

(56) References Cited

U.S. PATENT DOCUMENTS

| 2015/0303803 | A1* | 10/2015 | Chen | H02M 3/1582 |
| | | | | 323/271 |
| 2019/0131877 | A1* | 5/2019 | Luff | H02M 3/1582 |
| 2021/0159794 | A1* | 5/2021 | Cho | H02M 3/1582 |
| 2022/0069712 | A1* | 3/2022 | Mondal | H02M 3/1582 |

* cited by examiner

ELECTRONIC DEVICE PERFORMING DIRECT VOLTAGE TO DIRECT VOLTAGE CONVERSION CONVERTING AN INPUT VOLTAGE TO A FIXED OUTPUT VOLTAGE AND OPERATING METHOD OF ELECTRONIC DEVICE

CROSS-REFERENCE TO RELATED APPLICATIONS

This application claims priority under 35 U.S.C. § 119 to Korean Patent Application No. 10-2020-0125623 filed on Sep. 28, 2020, in the Korean Intellectual Property Office, the disclosures of which are incorporated by reference herein in their entireties.

BACKGROUND

Embodiments of the present disclosure described herein relate to electronic devices, and more particularly, relate to electronic devices performing direct voltage to direct voltage conversions of three modes seamlessly and operating methods of the electronic devices.

Electronic devices may operate based on a power from the outside. For example, the electronic devices may convert an external power supply voltage supplied from the outside to an internal power supply voltage necessary for components therein and may use the internal power supply voltage. Mobile devices such as a smartphone and a smart pad may further include a battery.

When an external power supply voltage is supplied, the mobile devices may convert the external power supply voltage to an internal power supply voltage and may use the internal power supply voltage. In addition, when the external power supply voltage is supplied, the mobile devices may charge the battery by using the external power supply voltage. When the supply of external power supply voltage is blocked, the mobile devices may convert a battery power supply voltage to the internal power supply voltage and may use the internal power supply voltage.

The battery power supply voltage may vary depending on a charge percentage (or a charge level) of the battery. For example, as a charge percentage of the battery increases, the battery power supply voltage may increase. As a charge percentage of the battery decreases, the battery power supply voltage may decrease. Accordingly, a device that converts the battery power supply voltage to the internal power supply voltage may be configured to convert a varying input voltage (i.e., the battery power supply voltage) to a fixed voltage (i.e., the internal power supply voltage).

SUMMARY

Example embodiments of the present disclosure provide electronic devices including a direct voltage to direct voltage converter seamlessly converting an input voltage to a fixed output voltage when the input voltage varies.

According to some example embodiments of the present disclosure, an electronic device includes a direct voltage to direct voltage converter, and a controller that receives first current information, second current information, an input voltage, and a feedback voltage from the direct voltage to direct voltage converter, controls the direct voltage to direct voltage converter based on the input voltage in one of a first mode, a second mode, or a third mode, controls the direct voltage to direct voltage converter based on the first current information and an output voltage such that buck conversion is performed in the first mode and the second mode, and controls the direct voltage to direct voltage converter based on the second current information and the output voltage such that boost conversion is performed in the second mode and the third mode. The direct voltage to direct voltage converter includes an inductor connected between a first node and a second node, a first switch connected between the first node and an input node, a second switch connected between the first node and a ground node, a third switch connected between the second node and the ground node, a fourth switch connected between the second node and an output node, a capacitor connected between the output node and the ground node, and resistors connected in series between the output node and the ground node, and configured to generate the feedback voltage smaller than the output voltage output from the output node.

According to some example embodiments of the present disclosure, an operating method of an electronic device which includes an inductor, a capacitor, a first switch and a second switch associated with buck conversion, and a third switch and a fourth switch associated with boost conversion includes extracting first current information about the buck conversion from the first switch and extracting second current information about the boost conversion from the third switch, controlling the first, second, third, and fourth switches based on the first current information such that the buck conversion is performed, in a first mode, controlling the first, second, third, and fourth switches based on the second current information such that the boost conversion is performed, in a third mode, and controlling the first, second, third, and fourth switches based on the first current information and the second current information such that buck-boost conversion is performed, in a second mode.

According to an embodiment, an electronic device includes a direct voltage to direct voltage converter, and a controller that controls the direct voltage to direct voltage converter. The direct voltage to direct voltage converter includes an inductor connected between a first node and a second node, a first switch connected between the first node and an input node, a second switch connected between the first node and a ground node, a third switch connected between the second node and the ground node, a fourth switch connected between the second node and an output node, a capacitor connected between the output node and the ground node, and resistors connected in series between the output node and the ground node, and configured to generate a feedback voltage smaller than an output voltage of the output node. The controller is configured to select a first mode when an input voltage of the input node is higher than a first level, to select a third mode when the input voltage is lower than a second level lower than the first level, and to select a second mode when the input voltage is equal to or lower than the first level and is equal to or higher than the second level, and control the first, second, third, and fourth switches based on a set and a reset of the first control signal such that buck conversion is performed, in the first mode, to control the first, second, third, and fourth switches based on a set and a reset of the second control signal such that boost conversion is performed, in the third mode, and to control the first, second, third, and fourth switches based on the set and the reset of the first control signal and the set and the reset of the second control signal such that buck-boost conversion is performed, in the second mode, and wherein the controller includes a first conversion controller that outputs a first control signal which is set periodically and is reset when the feedback voltage is lower than a first target level, and a second conversion controller that outputs a second control signal which is set periodically and is reset when the feedback voltage is lower than a second target level.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the present disclosure.

Figure 1:
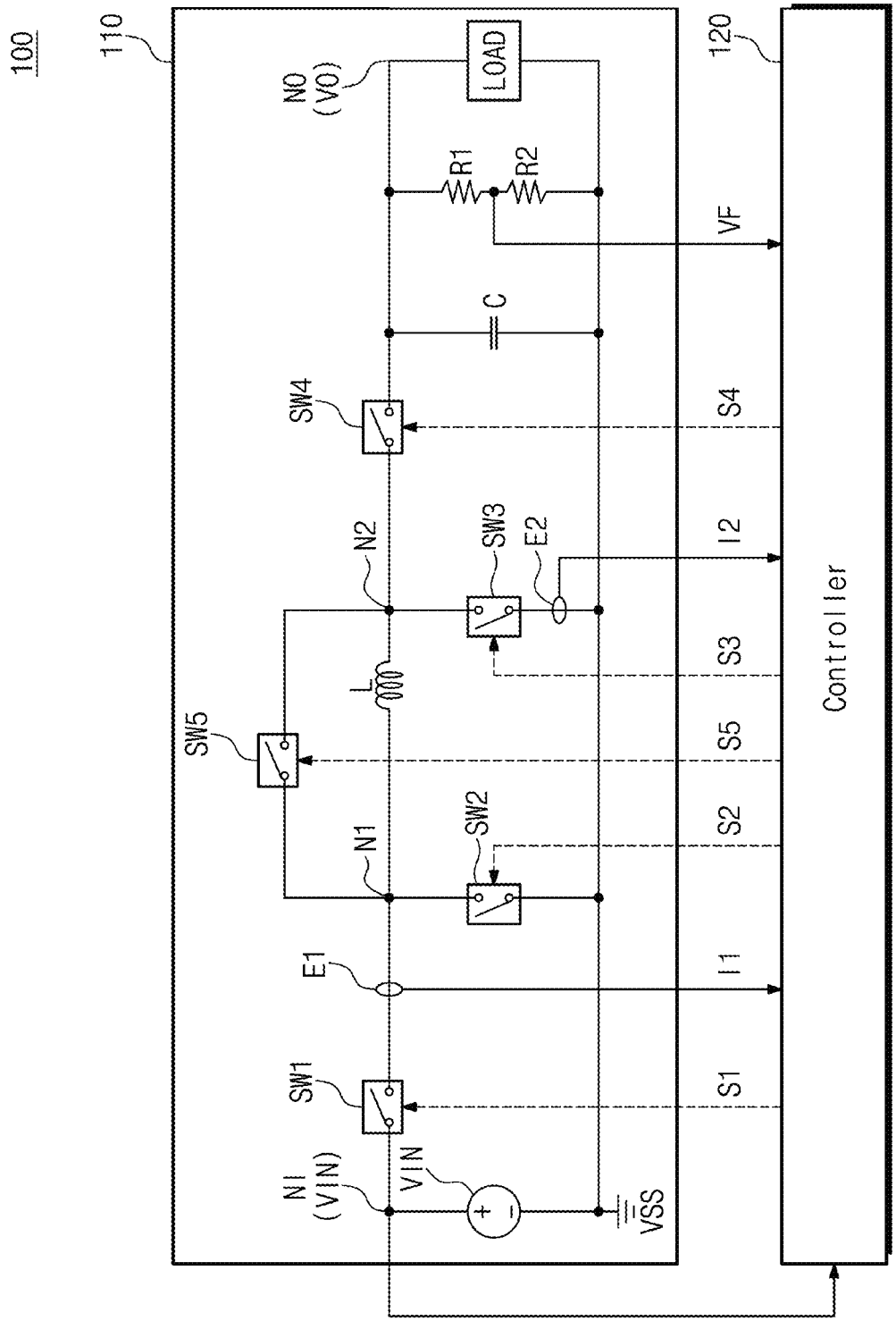
FIG. 1 illustrates an electronic device according to some example embodiments.

FIG. 1 illustrates an electronic device 100 according to some example embodiments. Referring to FIG. 1, the electronic device 100 may include a direct voltage to direct voltage converter 110 and a controller 120. The direct voltage to direct voltage converter 110 may include a first switch SW1, a second switch SW2, a third switch SW3, a fourth switch SW4, a fifth switch SW5, an inductor "L", a capacitor "C", a first resistor R1, and a second resistor R2.

The first switch SW1 may be connected between an input node NI to which an input voltage VIN is transferred and a first node N1. The first switch SW1 may be controlled by a first signal S1 transferred from the controller 120. The second switch SW2 may be connected between the first node N1 and a ground node to which a ground voltage VSS is input. The second switch SW2 may be controlled by a second signal S2 transferred from the controller 120.

The third switch SW3 may be connected between a second node N2 and the ground node to which the ground voltage VSS is input. The third switch SW3 may be controlled by a third signal S3 transferred from the controller 120. The fourth switch SW4 may be connected between the second node N2 and an output node NO from which an output voltage VO is output. The fourth switch SW4 may be controlled by a fourth signal S4 transferred from the controller 120.

The fifth switch SW5 and the inductor "L" may be connected in parallel between the first node N1 and the second node N2. The fifth switch SW5 may be controlled by a fifth signal S5 transferred from the controller 120. The capacitor "C" may be connected between the output node NO and the ground node. The first resistor R1 and the second resistor R2 may be connected in series between the output node NO and the ground node. The first resistor R1 and the second resistor R2 may constitute a voltage divider that divides the output voltage VO to generate a feedback voltage VF. The feedback voltage VF may be transferred to the controller 120.

The direct voltage to direct voltage converter 110 may further include a first current extractor E1 and a second current extractor E2. The first current extractor E1 may extract a current flowing to the first node N1 through the first switch SW1, for example, first current information I1 about buck conversion. The second current extractor E2 may extract a current flowing to the ground node through the third switch SW3, for example, second current information I2 about boost conversion. The first current information I1 and the second current information I2 may be transferred to the controller 120. The first current information I1 and the second current information I2 may be a current or a voltage having a level indicating the amount of current.

In FIG. 1, the input voltage VIN of the direct voltage to direct voltage converter 110 is modeled by a voltage source. However, the input voltage VIN may be an external voltage (e.g., a battery power supply voltage) that is transferred to the direct voltage to direct voltage converter 110 from the outside of the electronic device 100, not the inside of the electronic device 100.

In FIG. 1, a load "LOAD" connected with the output node NO of the direct voltage to direct voltage converter 110 is modeled. However, the load "LOAD" may be not an internal component of the direct voltage to direct voltage converter 110 but an external component receiving the output voltage VO through the output node NO of the electronic device 100.

The controller 120 may receive the first current information I1, the second current information I2, the input voltage VIN, and the feedback voltage VF from the direct voltage to direct voltage converter 110. The controller 120 may control the first signal S1, the second signal S2, the third signal S3, the fourth signal S4, and the fifth signal S5 based on the first current information I1, the second current information I2, the input voltage VIN, and the feedback voltage VF.

For example, the controller 120 may allow the direct voltage to direct voltage converter 110 to operate in one of a first mode, a second mode, a third mode, and a fourth mode. In the first mode, the direct voltage to direct voltage converter 110 may operate as a buck converter that performs buck conversion. The buck conversion may be made to convert the input voltage VIN to the output voltage VO smaller than the input voltage VIN.

In the third mode, the direct voltage to direct voltage converter 110 may operate as a boost converter that performs boost conversion. The boost conversion may be made to convert the input voltage VIN to the output voltage VO greater than the input voltage VIN. In the second mode, the direct voltage to direct voltage converter 110 may operate as a buck-boost converter that performs buck-boost conversion. The buck-boost conversion may perform buck conversion and boost conversion together and may convert the input voltage VIN to the output voltage VO having a level similar to that of the input voltage VIN.

In the fourth mode, the direct voltage to direct voltage converter 110 may operate a low drop out (LDO) regulator that converts the input voltage VIN to the output voltage VO smaller than the input voltage VIN. For example, the controller 120 may select one of the first mode, the second mode, and the third mode based on the input voltage VIN. The controller 120 may select the fourth mode under control of the external device.

Figure 2:
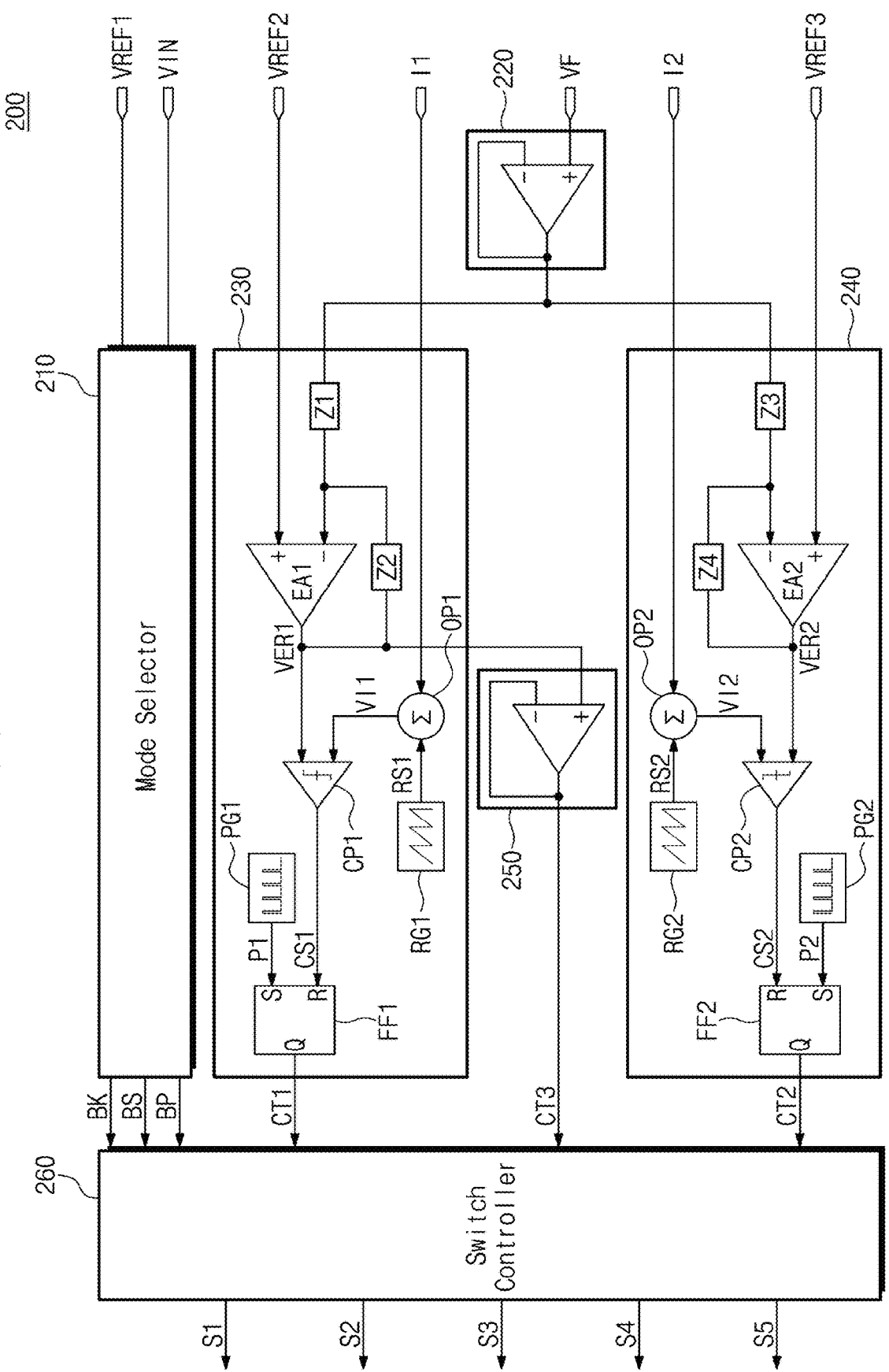
FIG. 2 illustrates a controller according to some example embodiments.

FIG. 2 illustrates a controller 200 according to some example embodiments. The controller 200 may correspond to the controller 120 of FIG. 1. Referring to FIGS. 1 and 2, the controller 200 may include a mode selector 210, a first buffer 220, a first conversion controller 230, a second conversion controller 240, a second buffer 250, and a switch controller 260.

The mode selector 210 may select a mode based on the input voltage VIN. The mode selector 210 may receive a first reference voltage VREF1 together with the input voltage VIN. The mode selector 210 may determine whether the input voltage VIN belongs to any range, by using the first reference voltage VREF1.

For example, when the input voltage VIN is higher than a first level, the mode selector 210 may select the first mode such that the first to fifth switches SW1 to SW5 of the direct voltage to direct voltage converter 110 perform the buck conversion. When the input voltage VIN is lower than a second level lower than the first level, the mode selector 210 may select the third mode such that the first to fifth switches SW1 to SW5 of the direct voltage to direct voltage converter 110 perform the boost conversion.

When the input voltage VIN is the first level or lower and is the second level or higher, the mode selector 210 may select the second mode such that the first to fifth switches SW1 to SW5 of the direct voltage to direct voltage converter 110 perform the buck-boost conversion.

For example, the mode selector 210 may generate the first level and the second level from the first reference voltage VREF1 and may compare the input voltage VIN with the first level and the second level. Alternatively, the mode selector 210 may generate a first comparison voltage to be compared with the first level and a second comparison voltage to be compared with the second level, from the input voltage VIN. By comparing the first comparison voltage and the second comparison voltage with the first reference voltage VREF1, the mode selector 210 may obtain the same result as comparing the input voltage VIN with the first level and the second level. The generation of a plurality of voltages from one voltage (e.g., the first reference voltage VREF1 or the input voltage VIN) may be performed by division, boost conversion, buck conversion, and/or a combination thereof.

The mode selector 210 may select the fourth mode depending on a given schedule, when the input voltage VIN reaches a specific level, or under control of the outside. For example, when a device or a system including the electronic device 100 is in a low-power mode (e.g., schedule), the mode selector 210 may select the fourth mode. When the first mode or the second mode is selected, the mode selector 210 may activate a buck signal BK. In response to the activation of the buck signal BK, the buck conversion of the direct voltage to direct voltage converter 110 may be enabled.

When the second mode or the third mode is selected, the mode selector 210 may activate a boost signal BS. In response to the activation of the boost signal BS, the boost conversion of the direct voltage to direct voltage converter 110 may be enabled. When the fourth mode is selected, the mode selector 210 may activate a bypass signal BP. In response to the activation of the bypass signal BP, an LDO regulator of the direct voltage to direct voltage converter 110 may be activated.

The first buffer 220 may receive the feedback voltage VF and may output the same voltage as the feedback voltage VF. In the detailed description, an input voltage and an output voltage of the first buffer 220 may be identically referred to as the "feedback voltage VF". The first buffer 220 may include a voltage follower.

The first buffer 220 may include an amplifier including a positive input of receiving the feedback voltage VF, a negative input of receiving the output voltage, and an output of outputting the output voltage (e.g., the feedback voltage VF). The feedback voltage VF output from the first buffer 220 may be transferred to the first conversion controller 230 and the second conversion controller 240.

The first buffer 220 may prevent or reduce an input resistance of the first conversion controller 230 and an input resistance of the second conversion controller 240 from affecting the feedback voltage VF output from the direct voltage to direct voltage converter 110. That is, the first buffer 220 may prevent or reduce a change in the output voltage VO of the direct voltage to direct voltage converter 110, which occurs by the controller 200.

The first conversion controller 230 may include a first error amplifier EA1, a first comparator CP1, a first flip-flop FF1, a first impedance element Z1, a second impedance element Z2, a first ramp signal generator RG1, a first operator OP1, and a first pulse generator PG1.

A positive input of the first error amplifier EA1 may receive a second reference voltage VREF2. A negative input of the first error amplifier EA1 may receive the feedback voltage VF from the first buffer 220 through the first impedance element Z1. An output of the first error amplifier EA1 may output a first error voltage VER1.

The output of the first error amplifier EA1 may be fed back to the negative input of the first error amplifier EA1 through the second impedance element Z2 and may be input to the second buffer 250. The first error amplifier EA1 may be an operational amplifier that outputs a voltage depending on voltage inputs.

The first impedance element Z1 and the second impedance element Z2 may adjust and stabilize a gain of the first error amplifier EA1. The first error amplifier EA1 may amplify a difference between the second reference voltage VREF2 and the feedback voltage VF and may output the amplified difference as the first error voltage VER1.

For example, the first error amplifier EA1 may determine whether the feedback voltage VF is lower than a first target level, together with the first impedance element Z1 and the second impedance element Z2. For example, the second reference voltage VREF2 may correspond to the first target level. The second reference voltage VREF2 may be generated from the same bandgap reference voltage together with the first reference voltage VREF1. For another example, the expression "the first error amplifier EA1 may compare the second reference voltage VREF2 and the feedback voltage VF" may be interchangeable with the expression "the first error amplifier EA1 may compare the first target level and the feedback voltage VF".

The first ramp signal generator RG1 may output a first ramp signal RS1. The first ramp signal RS1 may be a periodic signal. In one period of the first ramp signal RS1, the first ramp signal RS1 may continuously increase. A period of the first ramp signal RS1 may be associated with (e.g., identical to) a period of buck conversion, boost conversion, or buck-boost conversion.

The first operator OP1 may receive the first current information I1 from the direct voltage to direct voltage converter 110. The first operator OP1 may perform addition ($\Sigma$) on the first ramp signal RS1 and the first current information I1 to output a result of the addition as a voltage VI1 of first current information (hereinafter referred to as a "first current information voltage VI1"). The first current information voltage VI1 may correspond to a result of adding a waveform indicating, in the shape of a voltage, a change in a current amount indicated by the first current information I1 and a waveform of the first ramp signal RS1.

The first comparator CP1 may receive the first error voltage VER1 and the first current information voltage VI1. The first comparator CP1 may output a high level when the first current information voltage VI1 is greater than the first error voltage VER1 and may output a low level when the first current information voltage VI1 is smaller than the first error voltage VER1. An output of the first comparator CP1 may be a first comparison signal CS1.

The first pulse generator PG1 may output a first pulse signal P1. The first pulse signal P1 may be a periodic signal. In one period of the first pulse signal P1, the first pulse signal P1 may include one pulse that transitions from the low level to the high level and then transitions from the high level to the low level. A pulse of each period may be generated at the beginning or the end of each period. The period of the first pulse signal P1 may be associated with the period of buck conversion, boost conversion, or buck-boost conversion.

The first flip-flop FF1 may receive the first comparison signal CS1 at a reset input "R". The first flip-flop FF1 may receive the first pulse signal P1 at a set input "S". The first flip-flop FF1 may output a first control signal CT1 at an output "Q" in response to the first comparison signal CS1 and the first pulse signal P1.

The second conversion controller 240 may include a second error amplifier EA2, a second comparator CP2, a second flip-flop FF2, a third impedance element Z3, a fourth impedance element Z4, a second ramp signal generator RG2, a second operator OP2, and a second pulse generator PG2.

A positive input of the second error amplifier EA2 may receive a third reference voltage VREF3. A negative input of the second error amplifier EA2 may receive the feedback voltage VF from the first buffer 220 through the third impedance element Z3. An output of the second error amplifier EA2 may output a second error voltage VER2.

The output of the second error amplifier EA2 may be fed back to the negative input of the second error amplifier EA2 through the fourth impedance element Z4. The second error amplifier EA2 may be an operational amplifier. The third impedance element Z3 and the fourth impedance element Z4 may adjust and stabilize a gain of the second error amplifier EA2. The second error amplifier EA2 may amplify a difference between the third reference voltage VREF3 and the feedback voltage VF and may output the amplified difference as the second error voltage VER2.

For example, the second error amplifier EA2 may determine whether the feedback voltage VF is lower than a second target level, together with the third impedance element Z3 and the fourth impedance element Z4. For example, the third reference voltage VREF3 may correspond to the second target level. The third reference voltage VREF3 may be generated from the same bandgap reference voltage together with the first reference voltage VREF1 and the second reference voltage VREF2. For another example, the expression "the second error amplifier EA2 may compare the third reference voltage VREF3 and the feedback voltage VF" may be interchangeable with the expression "the second error amplifier EA2 may compare the second target level and the feedback voltage VF". For example, the third reference voltage VREF3 may be identical to the second reference voltage VREF2.

The second ramp signal generator RG2 may output a second ramp signal RS2. The second ramp signal RS2 may be a periodic signal. In one period of the second ramp signal RS2, the second ramp signal RS2 may continuously increase. The period of the second ramp signal RS2 may be associated with the period of buck conversion, boost conversion, or buck-boost conversion.

The second operator OP2 may receive the second current information I2 from the direct voltage to direct voltage converter 110. The second operator OP2 may perform addition ($\Sigma$) on the second ramp signal RS2 and the second current information I2 to output a result of the addition as a voltage VI2 of second current information (hereinafter referred to as a "second current information voltage VI2"). The second current information voltage VI2 may correspond to a result of adding a waveform indicating, in the shape of a voltage, a change in a current amount indicated by the second current information I2 and a waveform of the second ramp signal RS2.

The second comparator CP2 may receive the second error voltage VER2 and the second current information voltage VI2. The second comparator CP2 may output a high level when the second current information voltage VI2 is greater than the second error voltage VER2 and may output a low level when the second current information voltage VI2 is smaller than the second error voltage VER2. An output of the second comparator CP2 may be a second comparison signal CS2.

The second pulse generator PG2 may output a second pulse signal P2. The second pulse signal P2 may be a periodic signal. In one period of the second pulse signal P2, the second pulse signal P2 may include one pulse that transitions from the low level to the high level and then transitions from the high level to the low level. A pulse of each period may be generated at the beginning of each period. The period of the second pulse signal P2 may be associated with the period of buck conversion, boost conversion, or buck-boost conversion.

The second flip-flop FF2 may receive the second comparison signal CS2 at a reset input "R". The second flip-flop FF2 may receive the second pulse signal P2 at a set input "S". The second flip-flop FF2 may output a second control signal CT2 in response to the second comparison signal CS2 and the second pulse signal P2.

The second buffer 250 may receive the first error voltage VER1 output from the first error amplifier EA1 of the first conversion controller 230. The second buffer 250 may output the same voltage as the first error voltage VER1 as a third control signal CT3. The second buffer 250 may include a voltage follower. The second buffer 250 may include an amplifier including a positive input of receiving the first error voltage VER1, a negative input of receiving an output voltage of the second buffer 250, and an output of outputting the output voltage (e.g., the feedback voltage VF).

The switch controller 260 may receive the buck signal BK, the boost signal BS, and the bypass signal BP from the mode selector 210. The switch controller 260 may receive the first control signal CT1 and the second control signal CT2 from the first conversion controller 230 and the second conversion controller 240, respectively. The switch controller 260 may receive the third control signal CT3 from the second buffer 250.

The switch controller 260 may control the first to fifth switches SW1 to SW5 through the first to fifth signals S1 to S5. For example, when the buck signal BK is activated, the switch controller 260 controls the first to fifth switches SW1 to SW5 through the first to fifth signals S1 to S5 such that the buck conversion is performed in the first mode. When the boost signal BS is activated, the switch controller 260 controls the first to fifth switches SW1 to SW5 through the first to fifth signals S1 to S5 such that the boost conversion is performed in the third mode.

When the buck signal BK and the boost signal BS are activated, the switch controller 260 controls the first to fifth switches SW1 to SW5 through the first to fifth signals S1 to S5 such that the buck-boost conversion is performed in the second mode. When the bypass signal BP is activated, the switch controller 260 controls the first to fifth switches SW1 to SW5 through the first to fifth signals S1 to S5 so as to operate as an LDO regulator in the fourth mode.

Figure 3:
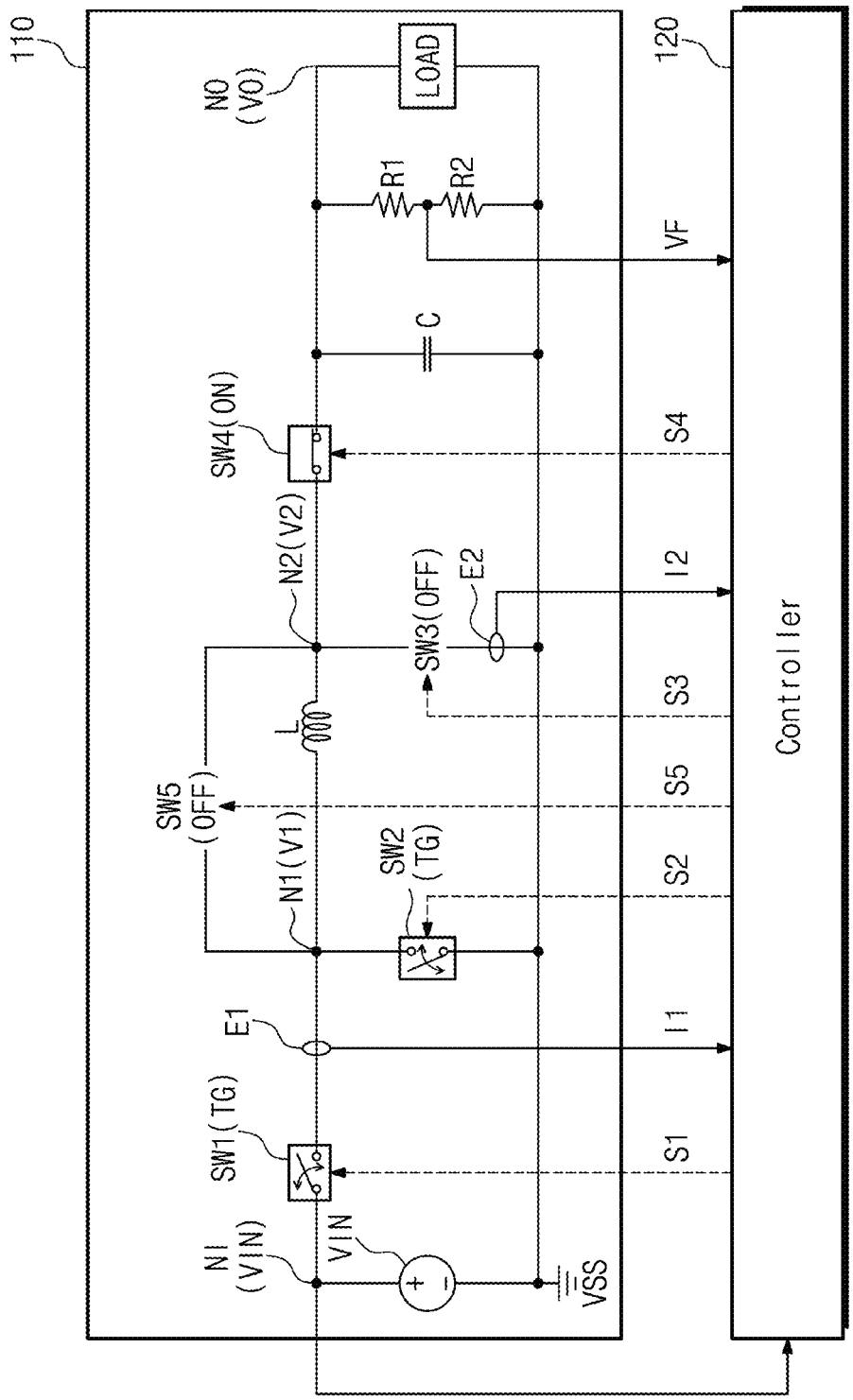
FIG. 3 illustrates some example embodiments in which a direct voltage to direct voltage converter performs buck conversion in a first mode.

FIG. 3 illustrates some example embodiments in which the direct voltage to direct voltage converter 110 performs buck conversion in the first mode. Referring to FIGS. 1, 2, and 3, the controller 200 or 120 may turn off the third switch SW3 through the third signal S3, may turn on the fourth switch SW4 through the fourth signal S4, and may turn off the fifth switch SW5 through the fifth signal S5.

The controller 200 or 120 may allow the first switch SW1 to toggle by using the first signal S1 and may allow the second switch SW2 to toggle by using the second signal S2. The first signal S1 and the second signal S2 may toggle to be complementary to each other. When the first switch SW1 is turned on, a current flows from the input node NI to the inductor "L" through the first switch SW1. In this case, the first current information I1 may be extracted by the first current extractor E1. When the second switch SW2 is turned on, a current flows from the inductor "L" to the ground node through the second switch SW2.

Figure 4:
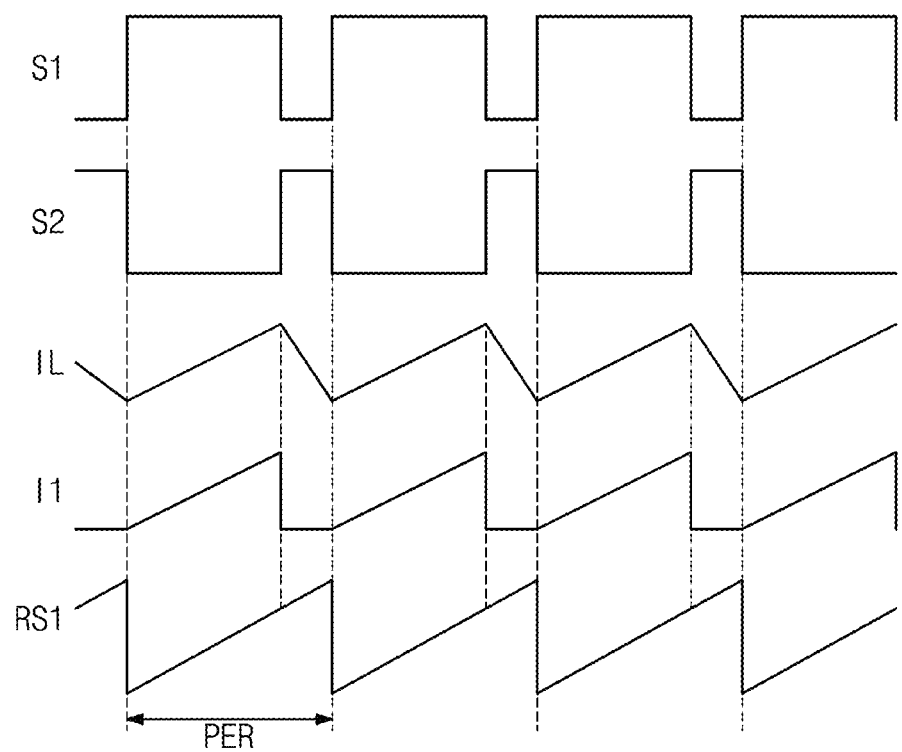
FIG. 4 illustrates some example embodiments of a first signal, a second signal, an inductor current, first current information, a first ramp signal, and a voltage of first current information generated when buck conversion of FIG. 3 is performed.

FIG. 4 illustrates some example embodiments of the first signal S1, the second signal S2, an inductor current IL, the first current information I1, and the first ramp signal RS1 generated when the buck conversion of FIG. 3 is performed. The inductor current IL may mean the amount of current flowing through the inductor "L". For example, to prevent or reduce a drawing from being unnecessarily complicated, the first ramp signal RS1 and the first current information I1 may be simply depicted, but a slope of the first ramp signal RS1 may be greater than a slop of the first current information I1.

Referring to FIGS. 2, 3, and 4, the first signal S1 and the second signal S2 may toggle to be periodic and complementary, based on a period PER. In each period PER, during a high level of the first signal S1, that is, during a duty of the first signal S1, the input voltage VIN is transferred to the inductor "L". Accordingly, the inductor current IL may increase, and the first current information I1 may increase. In each period PER, during a high level of the second signal S2, that is, during a duty, a current flows from the inductor "L" to the ground node. Accordingly, the inductor current IL may decrease, and the first current information I1 may not exist or may indicate a value of "0".

As the duty of the first signal S1 increases, the degree by which the input voltage VIN is stepped down by the direct voltage to direct voltage converter 110 may increase. Under this condition, the direct voltage to direct voltage converter 110 may generate the output voltage VO. As the duty of the first signal S1 decreases, the degree by which the input voltage VIN is stepped down by the direct voltage to direct voltage converter 110 may decrease. Under this condition, the direct voltage to direct voltage converter 110 may generate the output voltage VO.

The first ramp signal RS1 may continuously increase during the period PER. In each period PER, the first operator OP1 may add the first current information I1 and the first ramp signal RS1 to generate the first current information voltage VI1. The first operator OP1 may prevent or reduce subharmonic oscillation by adding the first ramp signal RS1 to the first current information I1.

The first flip-flop FF1 may output the first control signal CT1 that is set by the first pulse signal P1 at the beginning and is reset in response to that the first current information voltage VI1 is greater than the first error voltage VER1. As the first error voltage VER1 decreases, the first flip-flop FF1 may be reset by a component of the first current information voltage VI1, which corresponds to the first current information I1. That is, a timing when the first flip-flop FF1 is reset may be advanced. As the first error voltage VER1 increases, the first flip-flop FF1 may be reset by a component of the first ramp signal RS1. Here, the component of the first ramp signal RS1 may be higher than the component of the first current information voltage VI1, which corresponds to the first current information I1. That is, a timing when the first flip-flop FF1 is reset may be delayed. That is, the first control signal CT1 output from the first flip-flop FF1 may be a pulse width modulation signal, the pulse width of which is modulated by the first error voltage VER1.

The switch controller 260 may output the first signal S1 having a duty ratio identical (or similar) to a duty ratio of the first control signal CT1. The switch controller 260 may output the second signal S2 having a duty ratio that is inversely proportional to the duty ratio of the first control signal CT1. For example, the switch controller 260 may output the first control signal CT1 as the first signal S1 and may output an inverted version of the first control signal CT1 as the second signal S2.

As described above, the controller 200 may allow the feedback voltage VF to track the first target level. That is, the controller 200 may control the direct voltage to direct voltage converter 110 such that the output voltage VO tracks a target level of the output voltage VO.

Figure 5:
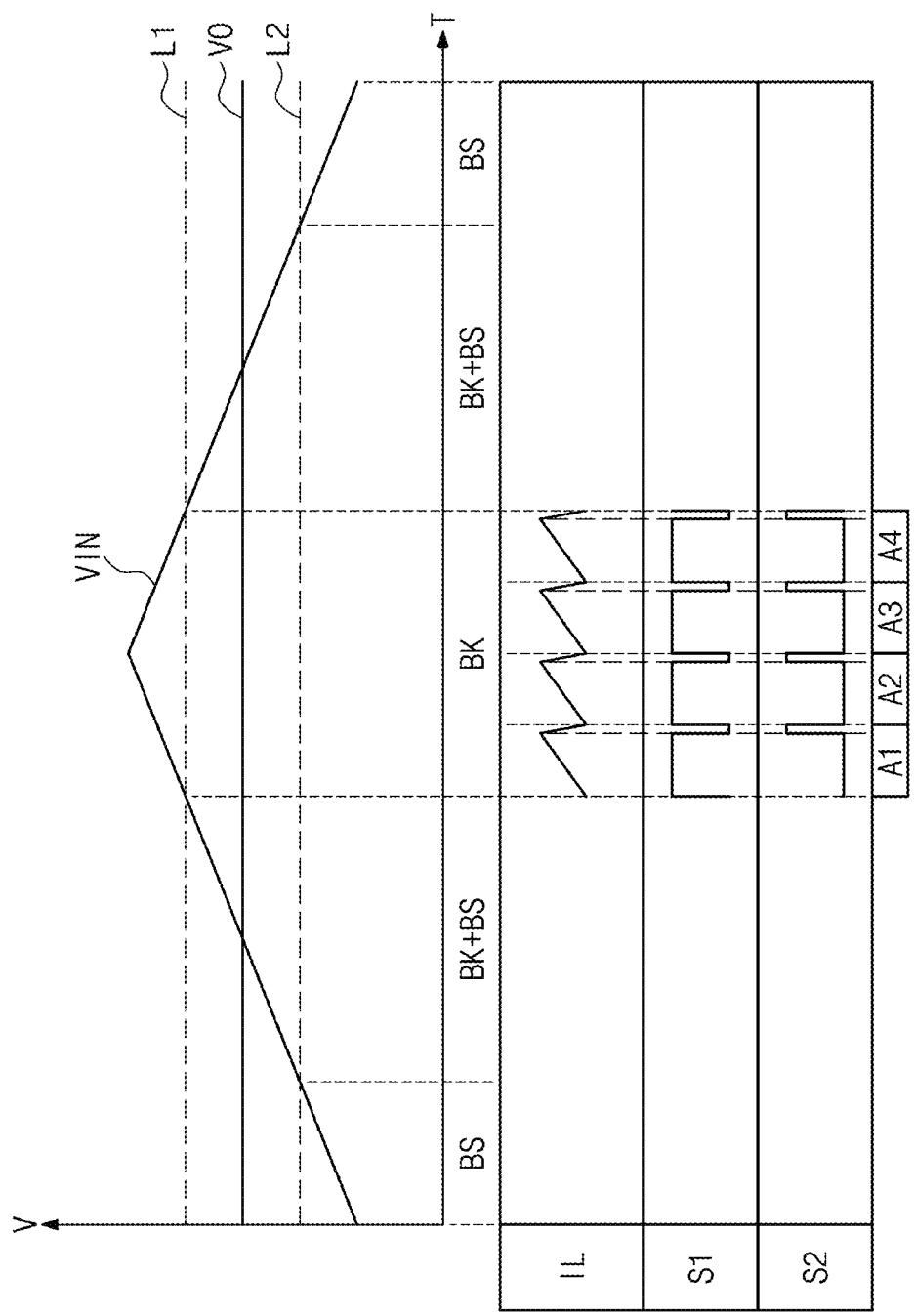
FIG. 5 illustrates some example embodiments of an operation of an electronic device maintaining an output voltage while an input voltage varies.

FIG. 5 illustrates some example embodiments of an operation of the electronic device 100 maintaining the output voltage VO while the input voltage VIN varies. Referring to FIGS. 2, 3, 4, and 5, it is assumed that the input voltage VIN increases from a level lower than a second level L2 to a level higher than a first level L1 and decreases from a level higher than the first level L1 to a level lower than the second level L2.

When the input voltage VIN is higher than the first level L1, the mode selector 210 may select the first mode and may activate the buck signal BK. The buck signal BK may be activated during first to fourth time periods A1 to A4. In the first to fourth time periods A1 to A4, a slope at which the inductor current IL increases may correspond to a value ((VIN−VO)/L) that is obtained by dividing a difference between the input voltage VIN and the output voltage VO by an inductance of the inductor "L".

In the first to fourth time periods A1 to A4, a slope at which the inductor current IL decreases may correspond to the following value: a value (−VO/L) obtained by adding a negative sign to a result of dividing the output voltage VO by the inductance of the inductor "L". To prevent or reduce a drawing from being unnecessarily complicated, a detailed change of the inductor current IL and a detailed change of the duty of the first signal S1 and the duty of the second signal S2 are omitted.

Figure 6:
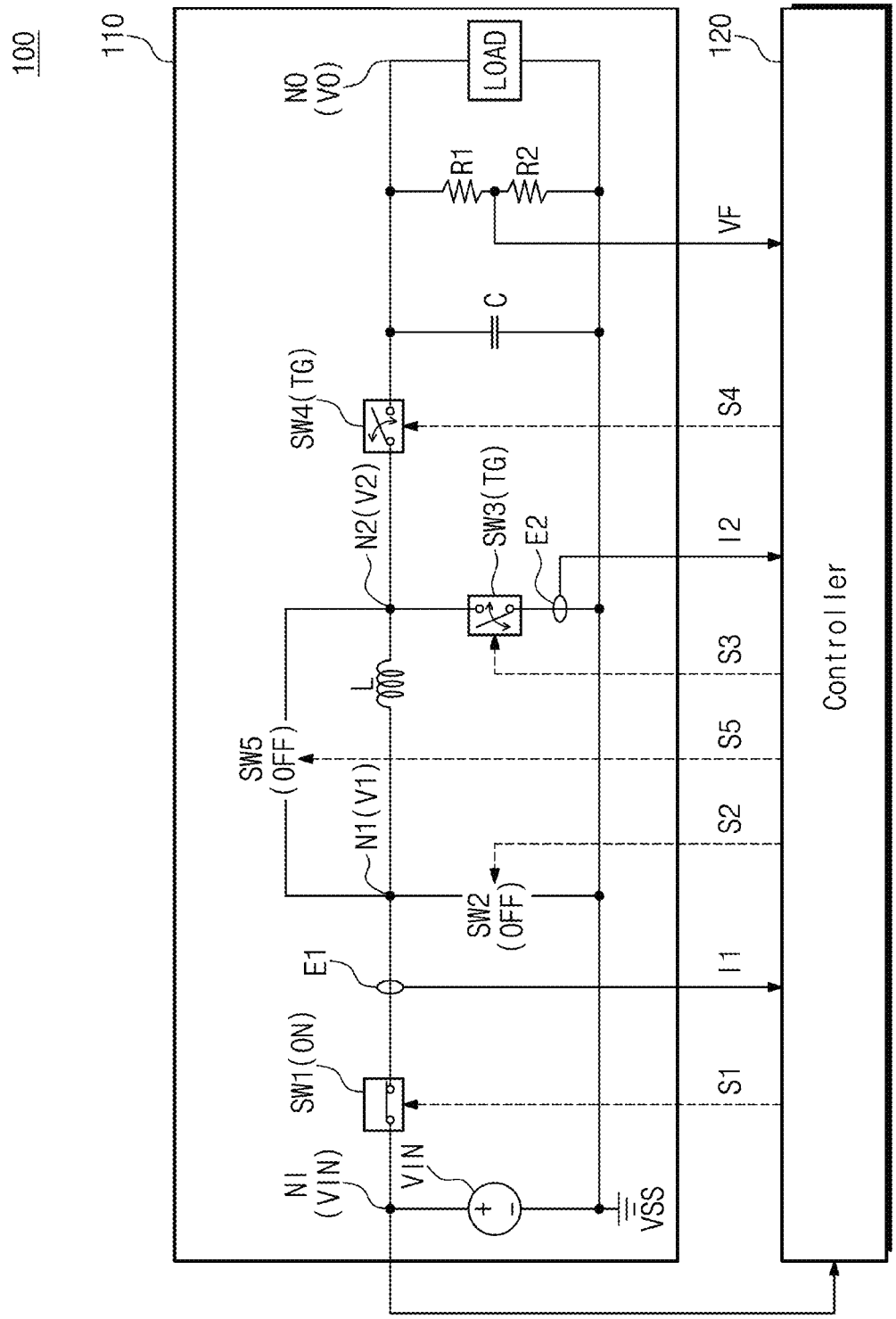
FIG. 6 illustrates some example embodiments in which a direct voltage to direct voltage converter performs boost conversion in a third mode.

FIG. 6 illustrates some example embodiments in which the direct voltage to direct voltage converter 110 performs the boost conversion in the third mode. Referring to FIGS. 1, 2, and 6, the controller 200 may turn on the first switch SW1 through the first signal S1, may turn off the second switch SW2 through the second signal S2, and may turn off the fifth switch SW5 through the fifth signal S5.

The controller 200 may allow the third switch SW3 to toggle by using the third signal S3 and may allow the fourth switch SW4 to toggle by using the fourth signal S4. The third signal S3 and the fourth signal S4 may toggle to be complementary to each other. When the third switch SW3 is turned on, a current flows from the input node NI through the inductor "L" and the third switch SW3, and the inductor "L" may be charged. In this case, the second current information I2 may be extracted by the second current extractor E2. When the fourth switch SW4 is turned on, a current flows from the inductor "L" to the output node NO through the fourth switch SW4. The output voltage VO may correspond to a result of adding a charging voltage of the inductor "L" to the input voltage VIN.

Figure 7:
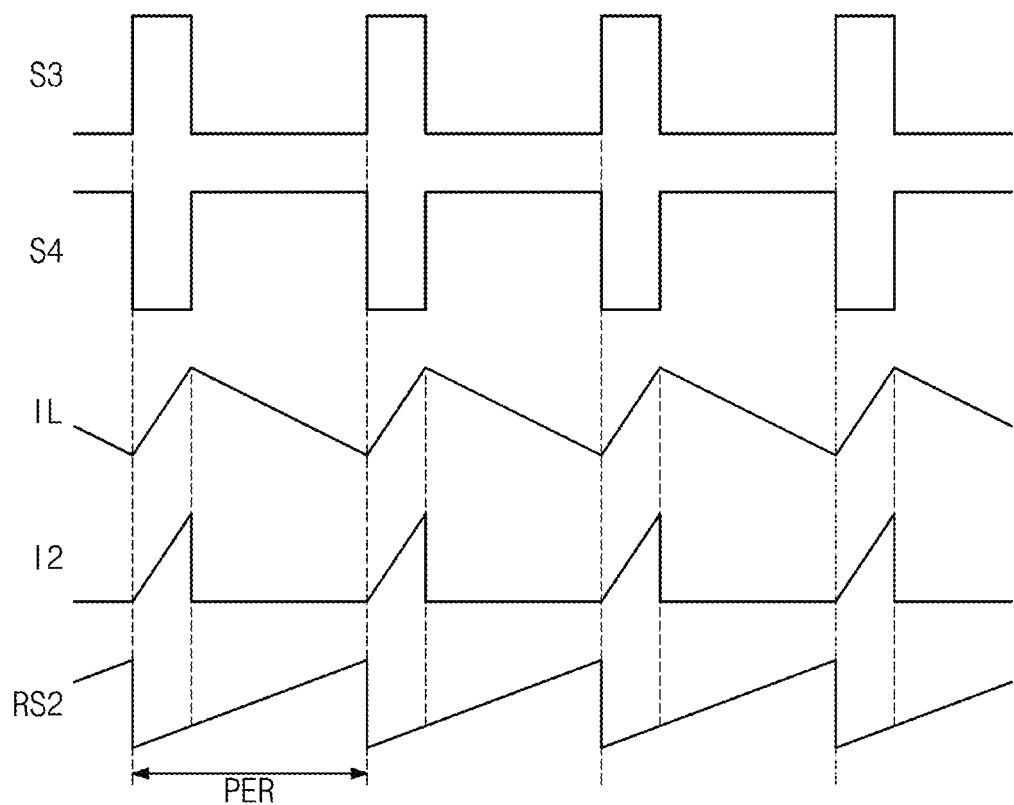
FIG. 7 illustrates some example embodiments of a third signal, a fourth signal, an inductor current, second current information, a second ramp signal, and a voltage of second current information generated when boost conversion of FIG. 6 is performed.

FIG. 7 illustrates some example embodiments of the third signal S3, the fourth signal S4, the inductor current IL, the second current information I2, and the second ramp signal RS2 generated when the boost conversion of FIG. 6 is performed. The inductor current IL may mean the amount of current flowing through the inductor "L". For example, to prevent or reduce a drawing from being unnecessarily complicated, the second ramp signal RS2 and the second current information I2 may be simply depicted, but a slope of the second ramp signal RS2 may be greater than a slop of the second current information I2.

Referring to FIGS. 2, 6, and 7, the third signal S3 and the fourth signal S4 may toggle to be periodic and complementary, based on a period PER, (e.g., a time period). In each period PER, during a high level of the third signal S3, that is, during a duty of the third signal S3, the input voltage VIN is transferred to the inductor "L". Accordingly, the inductor current IL may increase, and the second current information I2 may increase. In each period PER, during a high level of the fourth signal S4, that is, during a duty of the fourth signal S4, a current flows from the inductor "L" to the load "LOAD" through the output node NO. Accordingly, the inductor current IL may decrease, and the second current information I2 may not exist or may indicate a value of "0".

As the duty of the third signal S3 increases, the degree by which the input voltage VIN is stepped up by the direct voltage to direct voltage converter 110 may increase. Under this condition, the direct voltage to direct voltage converter 110 may generate the output voltage VO. As the duty of the third signal S3 decreases, the degree by which the input voltage VIN is stepped up by the direct voltage to direct voltage converter 110 may decrease. Under this condition, the direct voltage to direct voltage converter 110 may generate the output voltage VO.

The second ramp signal RS2 may continuously increase during the period PER. For another example, the second ramp signal RS2 may be associated with the second current information I2. In each period PER, while the second current information I2 increases, the second ramp signal RS2 may continuously increase. In each period PER, when the second current information I2 does not exist or indicates a value of "0", the second ramp signal RS2 may not exist or may indicate a value of "0"

In each period PER, during a time period where the second current information I2 increases, the second operator OP2 may add the second current information I2 and the second ramp signal RS2 to generate the second current information voltage VI2. The second operator OP2 may prevent or reduce subharmonic oscillation by adding the second ramp signal RS2 to the second current information I2.

The second flip-flop FF2 may output the second control signal CT2 that is set by the second pulse signal P2 at the beginning and is reset in response to that the second current information voltage VI2 is greater than the second error voltage VER2. As the second error voltage VER2 decreases, the second flip-flop FF2 may be reset by a component of the second current information voltage VI2, which corresponds to the second current information I2. That is, a timing when the second flip-flop FF2 is reset may be advanced. As the second error voltage VER2 increases, the second flip-flop FF2 may be reset by a component of the second ramp signal RS2. Here, the component of the second ramp signal RS2 may be higher than the component of the second current information voltage VI2, which corresponds to the second current information I2. That is, a timing when the second flip-flop FF2 is reset may be delayed. That is, the second control signal CT2 output from the second flip-flop FF2 may be a pulse width modulation signal, the pulse width of which is modulated by the second error voltage VER2.

The switch controller 260 may output the third signal S3 having a duty ratio identical (or similar) to a duty ratio of the second control signal CT2. The switch controller 260 may output the fourth signal S4 having a duty ratio that is inversely proportional to the duty ratio of the second control signal CT2. For example, the switch controller 260 may output the second control signal CT2 as the third signal S3 and may output an inverted version of the second control signal CT2 as the fourth signal S4.

As described above, the controller 200 may allow the feedback voltage VF to track the second target level. That is, the controller 200 may control the direct voltage to direct voltage converter 110 such that the output voltage VO tracks a target level of the output voltage VO.

Figure 8:
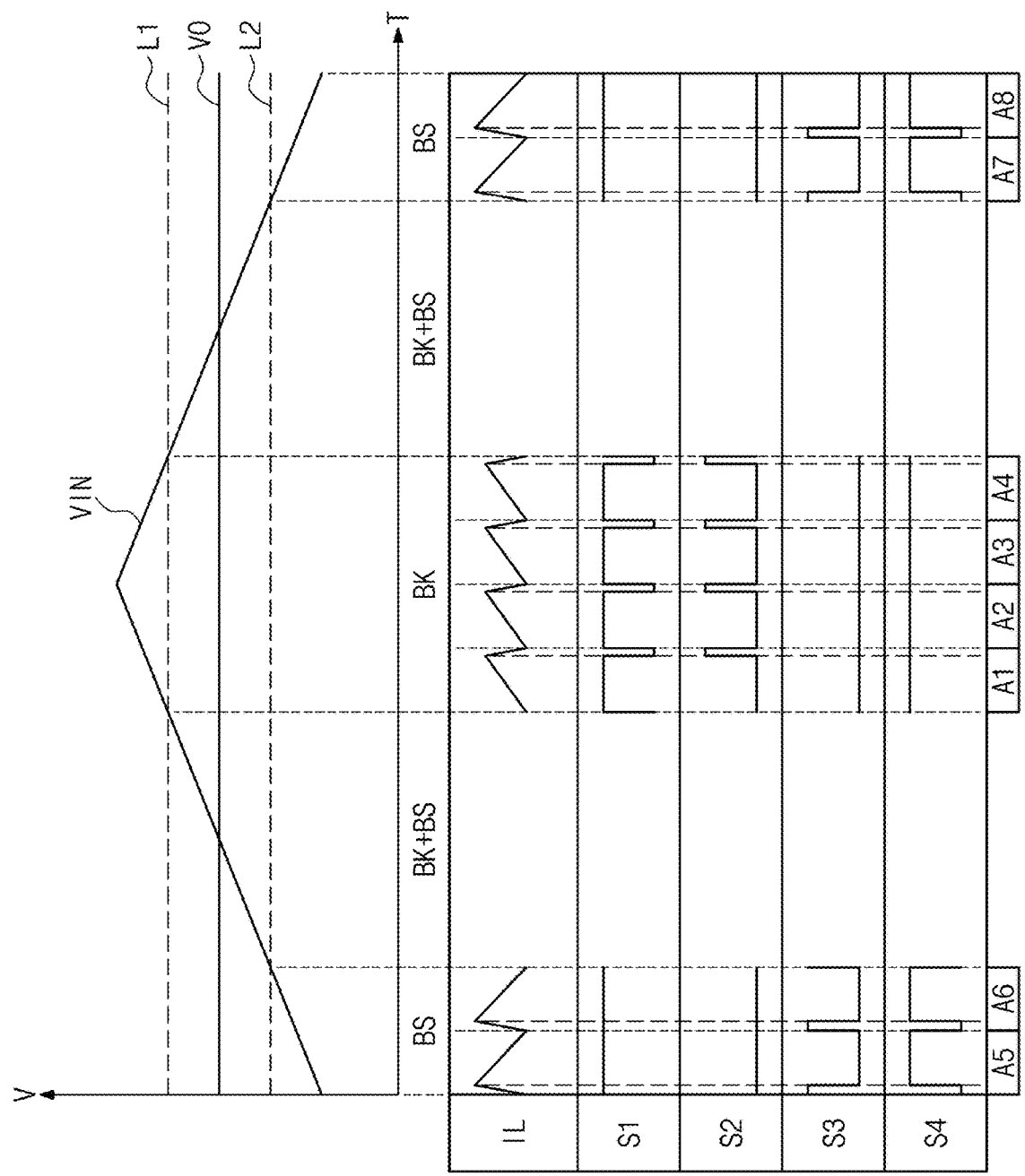
FIG. 8 illustrates some example embodiments of an operation of an electronic device maintaining an output voltage while an input voltage varies.

FIG. 8 illustrates some example embodiments of an operation of the electronic device 100 maintaining the output voltage VO while the input voltage VIN varies.

Referring to FIGS. 2, 6, 7, and 8, FIG. 8 shows an example embodiment in which an operation of the third mode is added in addition to FIG. 5.

When the input voltage VIN is lower than the second level L2, the mode selector 210 may select the third mode and may activate the boost signal BS. The boost signal BS may be activated during fifth to eighth time periods A5 to A8. In the fifth to eighth time periods A5 to A8, a slope at which the inductor current IL increases may correspond to a value (VIN/L) that is obtained by dividing the input voltage VIN by an inductance of the inductor "L".

In the fifth to eighth time periods A5 to A8, a slope at which the inductor current IL decreases may correspond to a value ((VIN−VO)/L) that is obtained by dividing a difference between the input voltage VIN and the output voltage VO by the inductance of the inductor "L". To prevent or reduce a drawing from being unnecessarily complicated, a detailed change of the inductor current IL and a detailed change of the duty of the third signal S3 and the duty of the fourth signal S4 are omitted.

Figure 9:
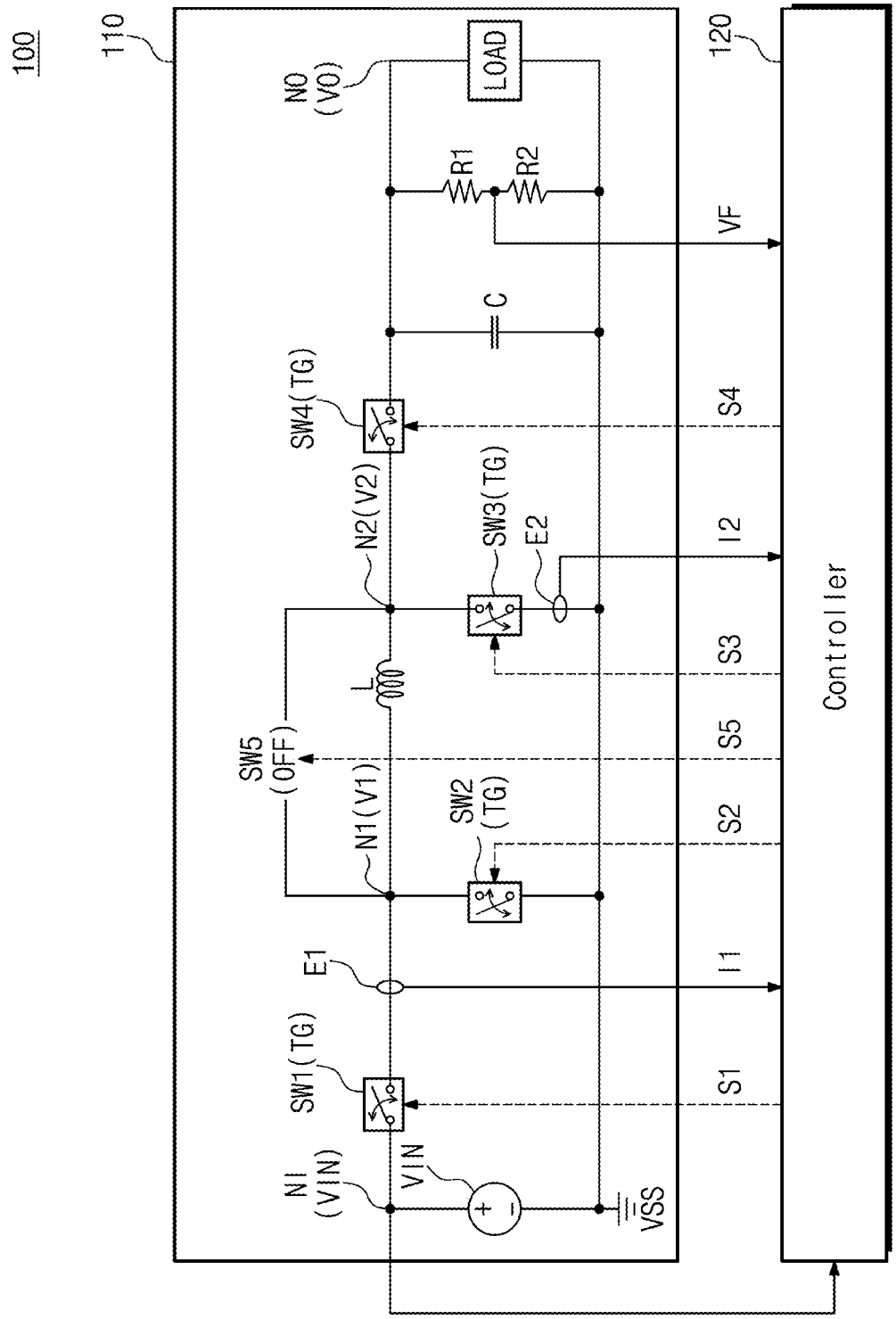
FIG. 9 illustrates some example embodiments in which a direct voltage to direct voltage converter performs buck-boost conversion in a second mode.

FIG. 9 illustrates some example embodiments in which the direct voltage to direct voltage converter 110 performs the buck-boost conversion in the second mode. Referring to FIGS. 1, 2, and 9, the controller 200 or 120 may turn off the fifth switch SW5 through the fifth signal S5.

As described with reference to FIGS. 3 to 5, the controller 200 may allow the first switch SW1 to toggle by using the first signal S1 and may allow the second switch SW2 to toggle by using the second signal S2. The first signal S1 and the second signal S2 may toggle to be complementary to each other. The first current information I1, the first ramp signal RS1, and the first current information voltage VI1 of the first conversion controller 230 may appear as illustrated in FIG. 4.

As described with reference to FIGS. 6 to 8, the controller 200 may allow the third switch SW3 to toggle by using the third signal S3 and may allow the fourth switch SW4 to toggle by using the fourth signal S4. The third signal S3 and the fourth signal S4 may toggle to be complementary to each other. The second current information I2, the second ramp signal RS2, and the second current information voltage VI2 of the second conversion controller 240 may appear as illustrated in FIG. 7.

A waveform of the inductor current IL may correspond to a result of adding the waveform of the inductor current IL described with reference to FIG. 4 and the waveform of the inductor current IL described with reference to FIG. 7.

Figure 10:
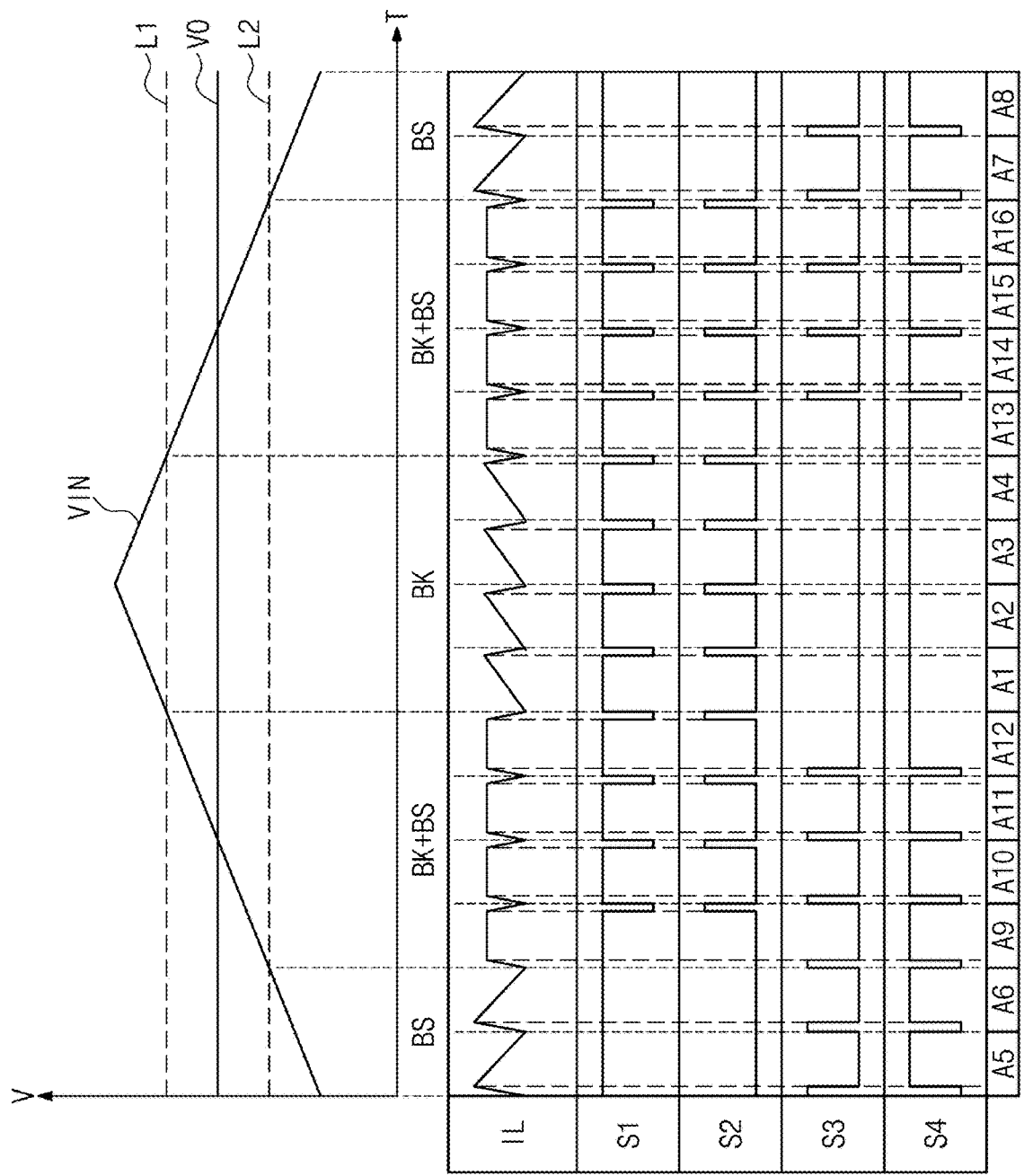
FIG. 10 illustrates some example embodiments of an operation of an electronic device maintaining an output voltage while an input voltage varies.

FIG. 10 illustrates some example embodiments of an operation of the electronic device 100 maintaining the output voltage VO while the input voltage VIN varies. Referring to FIGS. 2, 9, and 10, FIG. 10 shows an example embodiment in which an operation of the second mode is added in addition to FIG. 8.

When the input voltage VIN is equal to or higher than the second level L2 and is equal to or lower than the first level L1, the mode selector 210 may select the second mode and may activate the buck signal BK and the boost signal BS together (i.e., BK+BS). The buck signal BK and the boost signal BS may be activated together during ninth to sixteenth time periods A9 to A16. In the ninth to sixteenth time periods A9 to A16, a first slope at which the inductor current IL changes (e.g., increases) may correspond to a value (VIN/L) that is obtained by dividing the input voltage VIN by the inductance of the inductor "L".

In the ninth to sixteenth time periods A9 to A16, a second slope at which the inductor current IL changes (e.g., increases or decreases) may correspond to a value ((VIN−VO)/L) that is obtained by dividing a difference between the input voltage VIN and the output voltage VO by the inductance of the inductor "L". In the ninth to sixteenth time periods A9 to A16, a third slope at which the inductor current IL changes (e.g., decreases) may correspond to the following value: a value (−VO/L) obtained by adding a negative sign to a result of dividing the output voltage VO by the inductance of the inductor "L". To prevent or reduce a drawing from being unnecessarily complicated, a detailed change of the inductor current IL and a detailed change of the duty of the first signal S1, the duty of the second signal S2, the duty of the third signal S3, and the duty of the fourth signal S4 are omitted.

As described above, the electronic device 100 may select one of the first mode, the second mode, and the third mode based on the input voltage VIN. The electronic device 100 may adjust the duties of the first signal S1 and the second signal S2 controlling the first switch SW1 and the second switch SW2 associated with the buck conversion, based on the first current information I1 and the output voltage VO associated with the buck conversion of the first mode (e.g., through the feedback voltage VF). For example, the first conversion controller 230 may maintain an active state in the first mode, the second mode, and the third mode or may enter a disable state in the third mode such that power consumption is reduced.

The electronic device 100 may adjust the duties of the first signal S1 and the second signal S2 controlling the first switch SW1 and the second switch SW2 associated with the buck conversion, based on the first current information I1 and the output voltage VO associated with the boost conversion of the third mode (e.g., through the feedback voltage VF). For example, the second conversion controller 240 may maintain an active state in the first mode, the second mode, and the third mode or may enter a disable state in the first mode such that power consumption is reduced.

The control of the first to fourth signals S1 to S4 for the buck conversion and/or the boost conversion based on the first current information I1, the second current information I2, and the output voltage VO (e.g., through the feedback voltage VF) and the selection of a mode based on the input voltage VIN may be independent of each other.

The first level L1 and the second level L2 for mode selection may influence a voltage conversion efficiency of the electronic device 100. The efficiency of buck conversion may be determined by a duty ratio of the first signal S1. Accordingly, as the duty ratio of the first signal S1 increases, the efficiency of buck conversion increases. The efficiency of boost conversion may be determined by a value obtained by subtracting a duty ratio of the third signal S3 from "1". Accordingly, as the duty ratio of the third signal S3 decreases, the efficiency of boost conversion increases.

The efficiency of buck-boost conversion may be determined by a value obtained by dividing the efficiency of buck conversion by the efficiency of boost conversion. When a duty ratio of buck conversion is "1", the efficiency of buck conversion may be "1". When a duty ratio of boost conversion is "0", the efficiency of boost conversion may be "1". When a duty ratio of buck conversion is "1" and a duty ratio of boost conversion is "0", the efficiency of buck-boost conversion may be "1".

That is, in a time period where an input voltage increases, an efficiency may be optimized by performing the boost conversion until a duty ratio of boost conversion is "0" and then performing the buck conversion having a duty ratio of "1". However, this configuration may cause discontinuity (or a discontinuous period) when the boost conversion is switched to the buck conversion and a change of the output voltage VO.

To prevent or reduce the discontinuity, the first level L1 and the second level L2 for performing the buck-boost conversion may be determined. When a duty ratio of buck conversion is smaller than "1" and a duty ratio of boost conversion is greater than "0", the efficiency of buck-boost conversion is lower than the efficiency of buck conversion and is lower than the efficiency of boost conversion. Accordingly, the setting of a difference between the first level L1 and the second level L2 may influence a conversion efficiency of the electronic device 100.

In the electronic device 100 according to some example embodiments, the first level L1 and the second level L2 for mode selection may be selected independently without an influence of any other parameter, signal, or component. Accordingly, to optimize the voltage conversion efficiency of the electronic device 100 becomes easier.

For example, the first target level for the buck conversion may be higher than the second target level for the boost conversion. In the first mode or the second mode, when the feedback voltage VF (or the output voltage VO) is lower than the first target level, the controller 200 may increase a duty ratio of buck conversion such that the feedback voltage VF (or the output voltage VO) increases. In the second mode or the third mode, when the feedback voltage VF (or the output voltage VO) is lower than the second target level, the controller 200 may increase a duty ratio of boost conversion such that the feedback voltage VF (or the output voltage VO) increases.

Figure 11:
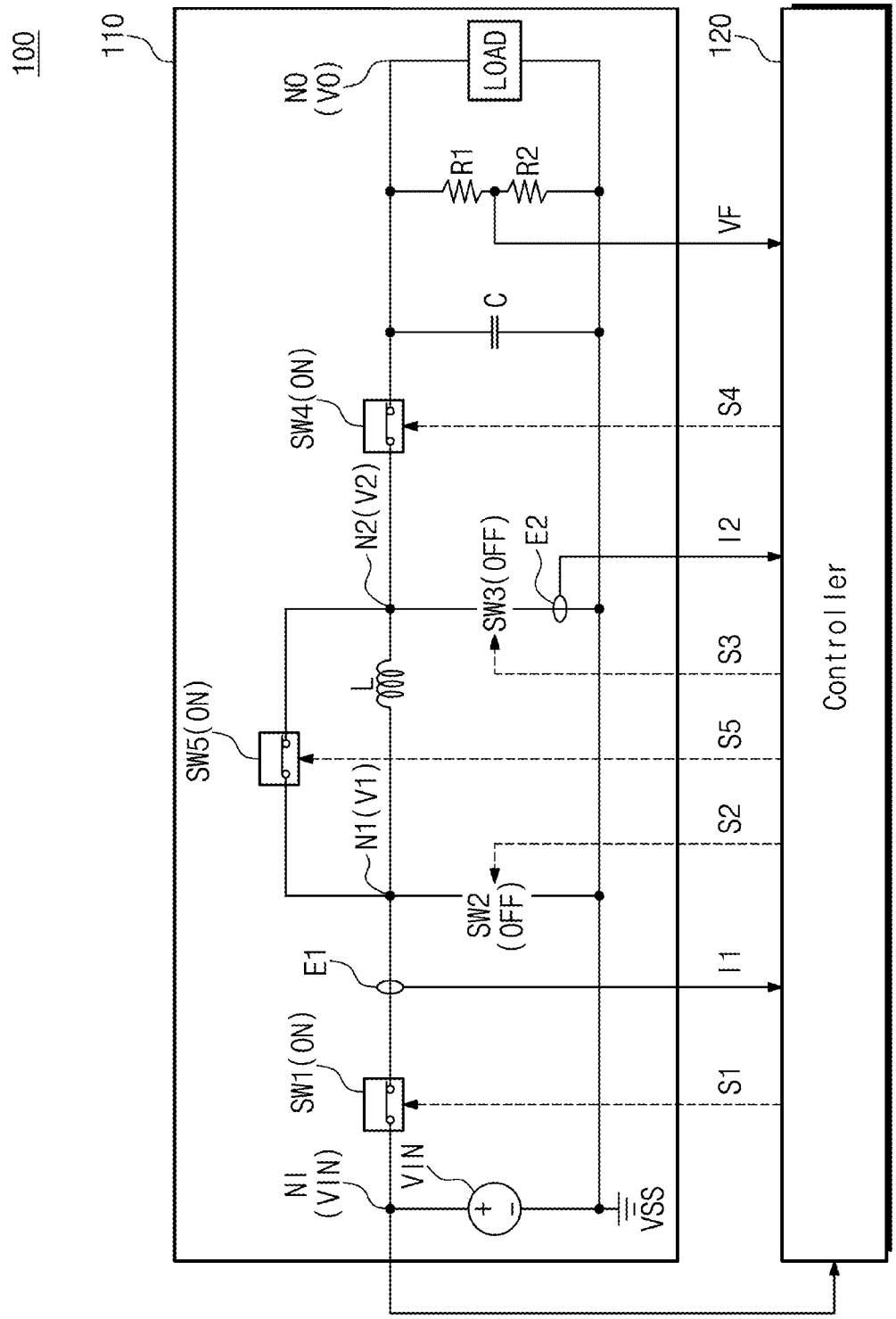
FIG. 11 illustrates some example embodiments in which an electronic device operates in a fourth mode.

FIG. 11 illustrates some example embodiments in which the electronic device 100 operates in the fourth mode. Referring to FIG. 11, in the fourth mode, the controller 120 may turn on the first switch SW1 by using the first signal S1, may turn off the second switch SW2 by using the second signal S2, may turn off the third switch SW3 by using the third signal S3, may turn on the fourth switch SW4 by using the fourth signal S4, and may turn on the fifth switch SW5 by using the fifth signal S5.

The input voltage VIN may be transferred to the output node NO through the first switch SW1, the fifth switch SW5, and the fourth switch SW4. The electronic device 100 may operate as an LDO regulator. For example, when a device or a system including the electronic device 100 is in a low-power mode, the electronic device 100 may operate in the fourth mode. For example, the fifth signal S5 may be the third control signal CT3.

Figure 12:
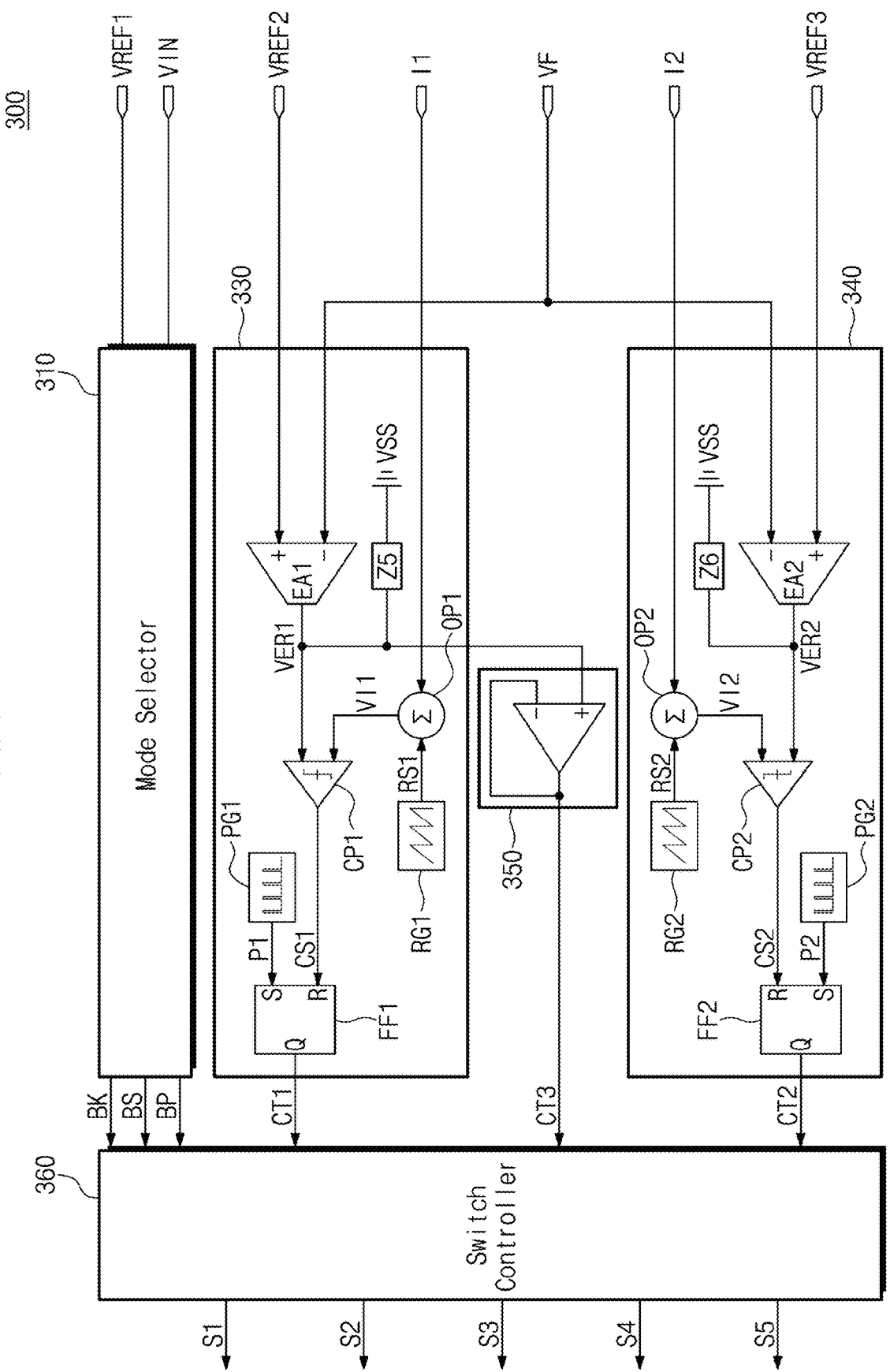
FIG. 12 illustrates a controller according to some example embodiments.

FIG. 12 illustrates a controller 300 according to some example embodiments. The controller 300 may correspond to the controller 120 of FIG. 1. Referring to FIGS. 1 and 12, the controller 300 may include a mode selector 310, a first conversion controller 330, a second conversion controller 340, a buffer 350, and a switch controller 360.

A configuration and an operation of the mode selector 310 may be identical to those of the mode selector 210 described with reference to FIGS. 1 to 11. Thus, additional description will be omitted to avoid redundancy. Compared with the controller 200 of FIG. 2, the controller 300 does not include the first buffer 220. Input impedance of the first conversion controller 330 and the second conversion controller 340 may be very great. Accordingly, the first conversion controller 330 and the second conversion controller 340 may not influence the feedback voltage VF, and thus, the first buffer 220 may be omitted.

The first conversion controller 330 may include the first error amplifier EA1, the first comparator CP1, the first flip-flop FF1, a fifth impedance element Z5, the first ramp signal generator RG1, the first operator OP1, and the first pulse generator PG1.

A positive input of the first error amplifier EA1 may receive the second reference voltage VREF2. A negative input of the first error amplifier EA1 may receive the feedback voltage VF. An output of the first error amplifier EA1 may be connected with the ground node through the fifth impedance element Z5 and may be input to the buffer 350. The first error amplifier EA1 may be a transconductance amplifier that outputs a current depending on voltage inputs. The fifth impedance element Z5 may generate the first error voltage VER1 from the output of the first error amplifier EA1.

Configurations and operations of the first comparator CP1, the first flip-flop FF1, the first ramp signal generator RG1, the first operator OP1, and the first pulse generator PG1 are identical to those described with reference to FIGS. 2 to 11. Thus, additional description will be omitted to avoid redundancy.

The second conversion controller 340 may include the second error amplifier EA2, the second comparator CP2, the second flip-flop FF2, a sixth impedance element Z6, the second ramp signal generator RG2, the second operator OP2, and the second pulse generator PG2.

A positive input of the second error amplifier EA2 may receive the third reference voltage VREF3. For example, the third reference voltage VREF3 may be identical to the second reference voltage VREF2. A negative input of the second error amplifier EA2 may receive the feedback voltage VF. An output of the second error amplifier EA2 may be connected with the ground node through the sixth impedance element Z6. The second error amplifier EA2 may be a transconductance amplifier that outputs a current depending on voltage inputs. The sixth impedance element Z6 may generate the second error voltage VER2 from the output of the second error amplifier EA2.

Configurations and operations of the second comparator CP2, the second flip-flop FF2, the second ramp signal generator RG2, the second operator OP2, and the second pulse generator PG2 are identical to those described with reference to FIGS. 2 to 11. Thus, additional description will be omitted to avoid redundancy.

Configurations and operations of the buffer 350 and the switch controller 360 are identical to those of the second buffer 250 and the switch controller 260 described with reference to FIGS. 2 to 11. Thus, additional description will be omitted to avoid redundancy.

Figure 13:
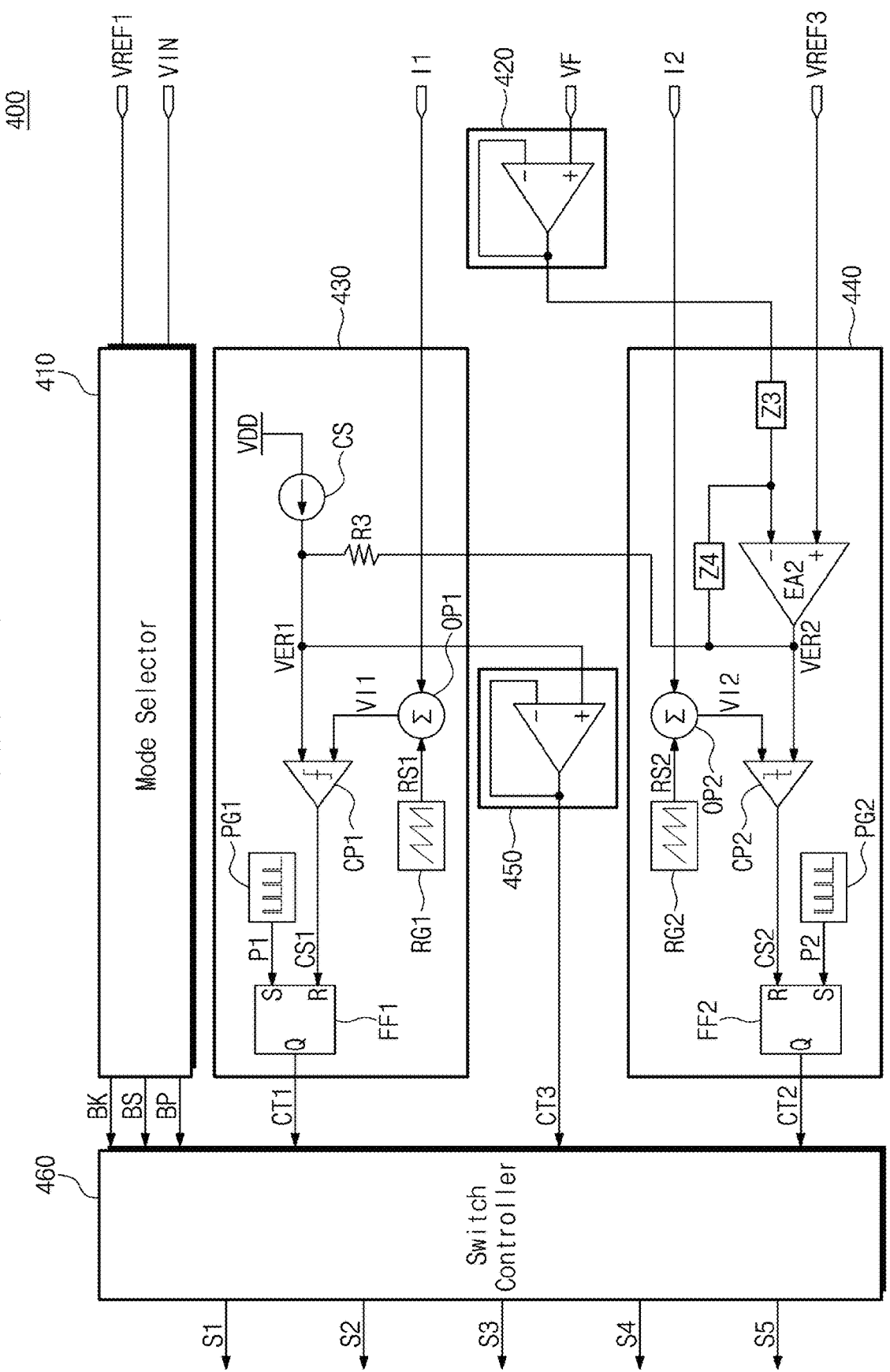
FIG. 13 illustrates a controller according to some example embodiments.

FIG. 13 illustrates a controller 400 according to some example embodiments. The controller 400 may correspond to the controller 120 of FIG. 1. Referring to FIGS. 1 and 13, the controller 400 may include a mode selector 410, a first buffer 420, a first conversion controller 430, a second conversion controller 440, a second buffer 450, and a switch controller 460.

The second conversion controller 440 may include the second error amplifier EA2, the second comparator CP2, the second flip-flop FF2, the third impedance element Z3, the fourth impedance element Z4, the second ramp signal generator RG2, the second operator OP2, and the second pulse generator PG2. Configurations and operations of the mode selector 410, the first buffer 420, the second conversion controller 440, the second buffer 450, and the switch controller 460 are identical to those of the mode selector 210, the first buffer 220, the second conversion controller 240, the second buffer 250, and the switch controller 260 described with reference to FIGS. 1 to 11. Thus, additional description will be omitted to avoid redundancy.

The first conversion controller 430 may include the first comparator CP1, the first flip-flop FF1, a third resistor R3, a current source CS, the first ramp signal generator RG1, the first operator OP1, and the first pulse generator PG1. The third resistor R3 and the current source CS may be connected in series between the output of the second error amplifier EA2 and a power node to which a power supply voltage VDD is supplied. The third resistor R3 and the current source CS may constitute a booster that boosts the second error voltage VER2 to generate the first error voltage VER1. The third resistor R3 and the current source CS may generate a voltage difference corresponding to a difference between the second target level for boost conversion and the first target level for buck conversion.

Configurations and operations of the first comparator CP1, the first flip-flop FF1, the first ramp signal generator RG1, the first operator OP1, and the first pulse generator PG1 are identical to those described with reference to FIGS. 2 to 11. Thus, additional description will be omitted to avoid redundancy.

Figure 14:
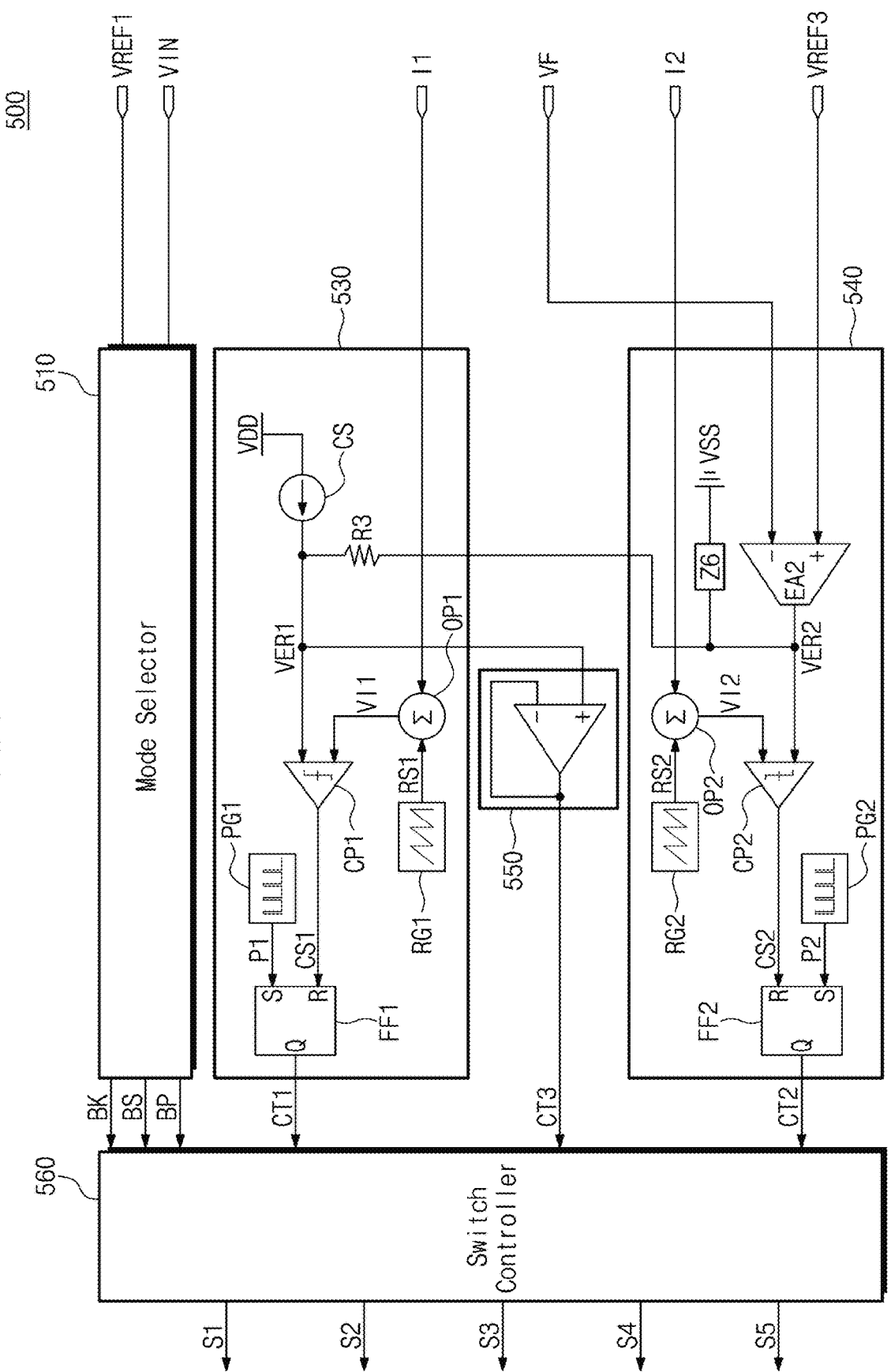
FIG. 14 illustrates a controller according to some example embodiments.

FIG. 14 illustrates a controller 500 according to some example embodiments. The controller 500 may correspond to the controller 120 of FIG. 1. Referring to FIGS. 1 and 14, the controller 500 may include a mode selector 510, a first conversion controller 530, a second conversion controller 540, a buffer 550, and a switch controller 560.

The second conversion controller 540 may include the second error amplifier EA2, the second comparator CP2, the second flip-flop FF2, a sixth impedance element Z6, the second ramp signal generator RG2, the second operator OP2, and the second pulse generator PG2. Configurations and operations of the mode selector 510, the second conversion controller 540, the buffer 550, and the switch controller 560 are identical to those of the mode selector 310, the second conversion controller 340, the buffer 350, and the switch controller 360 described with reference to FIGS. 1 to 12. Thus, additional description will be omitted to avoid redundancy.

The first conversion controller 530 may include the first comparator CP1, the first flip-flop FF1, the third resistor R3, the current source CS, the first ramp signal generator RG1, the first operator OP1, and the first pulse generator PG1. The third resistor R3 and the current source CS may be connected in series between the output of the second error amplifier EA2 and a power node to which a power supply voltage VDD is supplied. The third resistor R3 and the current source CS may constitute a booster that boosts the second error voltage VER2 to generate the first error voltage VER1. The third resistor R3 and the current source CS may generate a voltage difference corresponding to a difference between the second target level for boost conversion and the first target level for buck conversion.

Configurations and operations of the first comparator CP1, the first flip-flop FF1, the first ramp signal generator RG1, the first operator OP1, and the first pulse generator PG1 are identical to those described with reference to FIGS. 2 to 11. Thus, additional description will be omitted to avoid redundancy.

Figure 15:
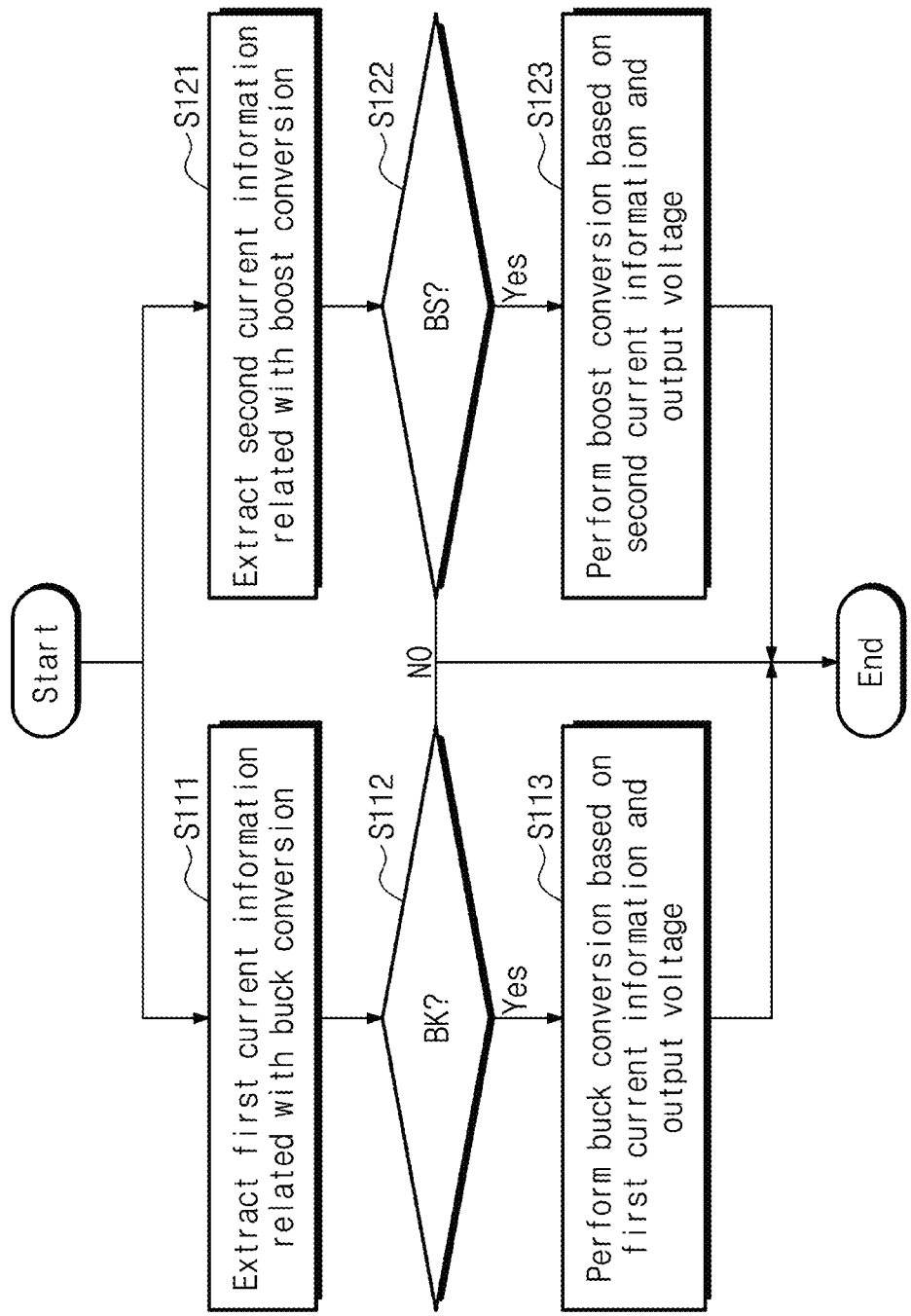
FIG. 15 illustrates an example of an operating method of an electronic device according to some example embodiments.

FIG. 15 illustrates an example of an operating method of the electronic device 100 according to some example embodiments. Referring to FIGS. 1, 2, and 15, in operation S111, the first current information I1 associated with the buck conversion may be extracted. The first current information I1 may include information of a current charging the inductor "L" in the buck conversion. The first current information I1 may be a current or a voltage signal indicating the amount of current.

In operation S112, whether the buck signal BK is activated is determined. When it is determined that the buck signal BK is activated, in operation S113, the buck conversion is performed based on the first current information I1 and the output voltage VO (e.g., through the feedback voltage VF). When it is determined that the buck signal BK is not activated, the buck conversion is not performed. For example, operation S112 may be performed before operation S111. That is, when the buck signal BK is not activated, the extraction of the first current information I1 may be omitted.

In operation S121, the second current information I2 associated with the boost conversion may be extracted. The second current information I2 may include information of a current charging the inductor "L" in the boost conversion. The second current information I2 may be a current or a voltage signal indicating the amount of current.

In operation S122, whether the boost signal BS is activated is determined. When it is determined that the boost signal BS is activated, in operation S123, the boost conversion is performed based on the second current information I2 and the output voltage VO (e.g., through the feedback voltage VF). When it is determined that the boost signal BS is not activated, the boost conversion is not performed. For example, operation S122 may be performed before operation S121. That is, when the boost signal BS is not activated, the extraction of the second current information I2 may be omitted.

Operation S111 to operation S113 may be performed in parallel with operation S121 to operation S123. Operation S111 to operation S113 may be performed in the first mode and the second mode. Operation S121 to operation S123 may be performed in the second mode and the third mode.

Figure 16:
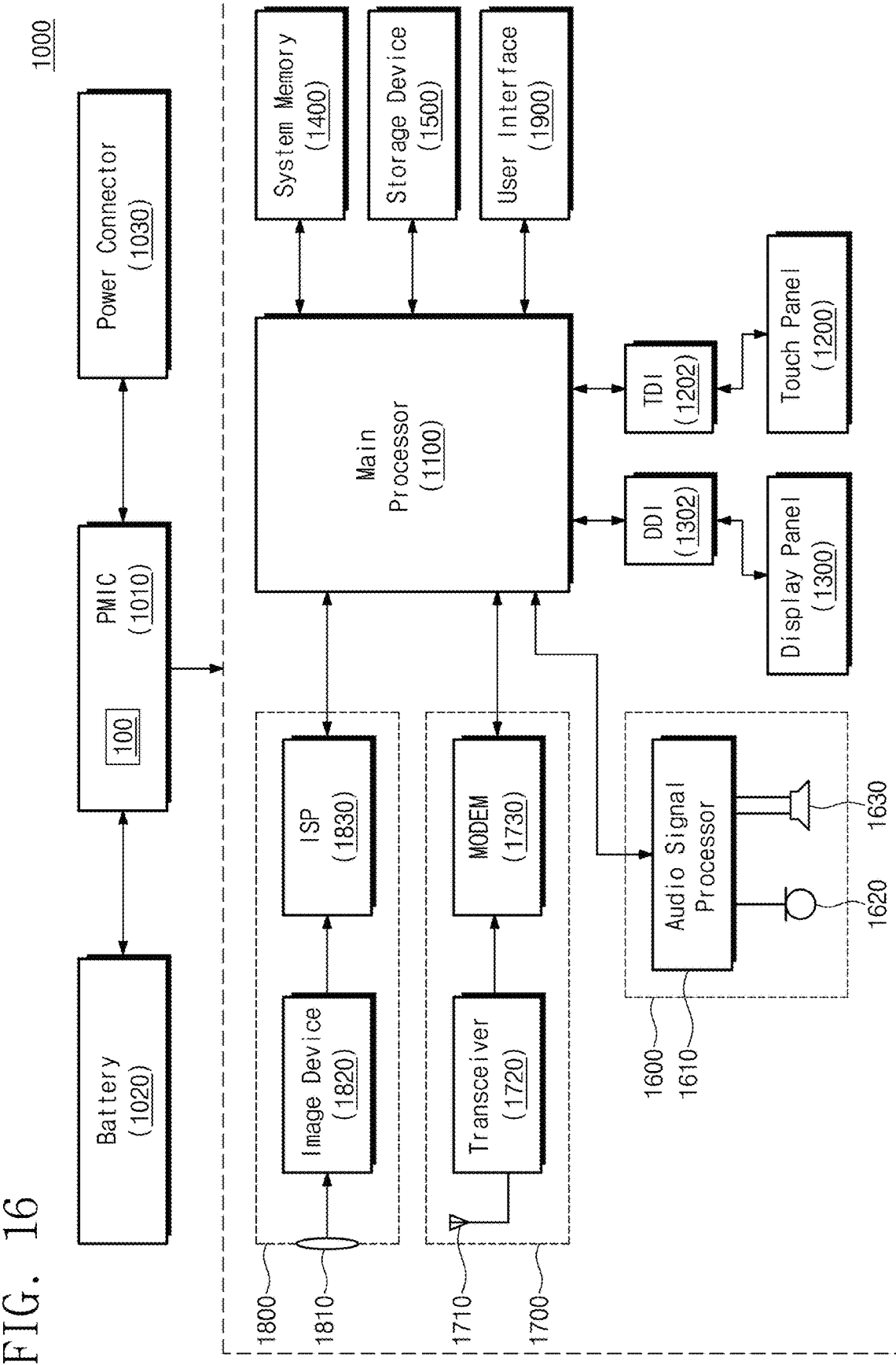
FIG. 16 is a block diagram illustrating an electronic device including an electronic device performing direct voltage to direct voltage conversion according to some example embodiments.

FIG. 16 is a block diagram illustrating an electronic device 1000 including the electronic device 100 performing direct voltage to direct voltage conversion according to some example embodiments. Referring to FIG. 16, the electronic device 1000 may include a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In some example embodiments, the electronic device 1000 may be one of various electronic devices such as a personal computer, a laptop computer, a server, a workstation, a portable communication terminal, a personal digital assistant (PDA), a portable media player (PMP), a digital camera, a smartphone, a tablet computer, and/or a wearable device.

The main processor 1100 may control overall operations of the electronic device 1000. The main processor 1100 may control/manage operations of the components of the electronic device 1000. The main processor 1100 may process various operations for the purpose of operating the electronic device 1000. The touch panel 1200 may be configured to sense a touch input from a user under control of the touch driving integrated circuit 1202. The display panel 1300 may be configured to display image information under control of the display driving integrated circuit 1302.

The system memory 1400 may store data that are used for an operation of the electronic device 1000. For example, the system memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory and/or a removable memory of the electronic device 1000.

The audio processor 1600 may process an audio signal by using an audio signal processor 1610. The audio processor 1600 may receive an audio input through a microphone 1620 or may provide an audio output through a speaker 1630. The communication block 1700 may exchange signals with an external device/system through an antenna 1710. A transceiver 1720 and a modulator/demodulator (MODEM) 2730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 1800 may receive a light through a lens 1810. An image device 1820 and an image signal processor (ISP) 1830 included in the image processor 1800 may generate image information about an external object, based on a received light. The user interface 1900 may include an interface capable of exchanging information with a user, except for the touch panel 1200, the display panel 1300, the audio processor 1600, and the image processor 1800. The user interface 1900 may include a keyboard, a mouse, a printer, a projector, various sensors, a human body communication device, etc.

The electronic device 1000 may further include a power management IC (PMIC) 1010, a battery 1020, and a power connector 1030. The power management IC 1010 may generate an interface power from a power supplied from the battery 1020 or a power supplied from the power connector 1030, and may provide the internal power to the main processor 1100, the touch panel 1200, the touch driver integrated circuit (TDI) 1202, the display panel 1300, the display driver integrated circuit (DDI) 1302, the system memory 1400, the storage device 1500, the audio processor 1600, the communication block 1700, the image processor 1800, and the user interface 1900. The power management IC 1010 may include the electronic device 100 performing direct voltage to direct voltage conversion according to some example embodiments.

In the above embodiments, components according to the present disclosure are described by using the terms "first", "second", "third", and the like. However, the terms "first", "second", "third", and the like may be used to distinguish components from each other and do not limit the present disclosure. For example, the terms "first", "second", "third", and the like do not involve an order or a numerical meaning of any form.

In the above embodiments, components according to example embodiments of the present disclosure are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

For example, the controller 120 (and the controllers 200, 300, 400, and 500, and switch controller 260, 360, 460, and 560, mode selector 210, 310, 410, and 510, and others) may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to the present disclosure, an electronic device selects a mode depending on a level of an input voltage and controls switching for voltage conversion based on current information about voltage conversion. Accordingly, an electronic device that performs seamless (or, alternatively, improved) voltage conversion and has an improved conversion efficiency is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. An electronic device comprising:
a direct voltage to direct voltage converter; and
a controller configured to:
  receive first current information, second current information, an input voltage, and a feedback voltage from the direct voltage to direct voltage converter;
  control the direct voltage to direct voltage converter based on the input voltage in one of a first mode, a second mode, or a third mode;
  control the direct voltage to direct voltage converter based on the first current information and an output voltage such that buck conversion is performed in the first mode and the second mode; and
  control the direct voltage to direct voltage converter based on the second current information and the output voltage such that boost conversion is performed in the second mode and the third mode, and
wherein the direct voltage to direct voltage converter includes:
  an inductor connected between a first node and a second node;
  a first switch connected between the first node and an input node;
  a second switch connected between the first node and a ground node;
  a third switch connected between the second node and the ground node;
  a fourth switch connected between the second node and an output node;
  a capacitor connected between the output node and the ground node; and
  resistors connected in series between the output node and the ground node, and configured to generate the feedback voltage smaller than the output voltage output from the output node,
wherein the controller includes a first conversion controller configured to output a first control signal which is set periodically and is reset when the feedback voltage is lower than a first target level; and a second conversion controller configured to output a second control signal which is set periodically and is reset when the feedback voltage is lower than a second target level.

2. The electronic device of claim 1, wherein the controller is further configured to:
select the first mode based on the input voltage being higher than a first level;
select the third mode based on the input voltage being lower than a second level lower than the first level; and
select the second mode based on the input voltage being equal to or lower than the first level and being equal to or higher than the second level.

3. The electronic device of claim 1, wherein the controller is further configured to control duties of first to fourth signals respectively applied to the first, second, third and fourth switches, based on the set and the reset of the first control signal and the set and the reset of the second control signal.

4. The electronic device of claim 3, wherein, in the first mode, the controller is configured to:
control the duty of the first signal and the duty of the second signal based on the set and the reset of the first control signal,
turn off the third switch through the third signal, and
turn on the fourth switch through the fourth signal.

5. The electronic device of claim 3, wherein, in the third mode, the controller is configured to
control the duty of the third signal and the duty of the fourth signal based on the set and the reset of the second control signal,
turn off the second switch through the second signal, and
turn on the first switch through the first signal.

6. The electronic device of claim 3, wherein, in the second mode, the controller is configured to
control the duty of the first signal and the duty of the second signal based on the set and the reset of the first control signal, and
control the duty of the third signal and the duty of the fourth signal based on the set and the reset of the second control signal.

7. The electronic device of claim 3, wherein the direct voltage to direct voltage converter further includes a fifth switch connected in parallel with the inductor,
wherein the controller is configured to control the fifth switch through a fifth signal, and
wherein, in a fourth mode, the controller is configured to turn on the first switch, the fourth switch, and the fifth switch and turn off the second switch and the third switch.

8. The electronic device of claim 1, wherein the first conversion controller includes:
a first amplifier configured to amplify a difference between a first reference voltage and the feedback voltage and to output the amplified difference as a first error voltage;
a first comparator configured to output a first comparison signal having a high level when a voltage of the first current information is greater than the first error voltage; and a first flip-flop configured to output the first control signal which is set periodically depending on a time period and is reset when the first comparison signal transitions to the high level.

9. The electronic device of claim 8, further comprising:
a buffer configured to receive the feedback voltage and to buffer the feedback voltage so as to be supplied to the first conversion controller,
wherein the first conversion controller further includes:
a first impedance element connected between an output of the buffer and a negative input of an amplifier;
a second impedance element connected between the negative input and an output of the amplifier;
a first ramp signal generator configured to generate a first ramp signal periodically depending on the time period;
a first operator configured to add the first ramp signal to the first current information and to output a result of the addition of the first ramp signal and the first current information to the comparator as the voltage of the first current information; and
a first pulse generator configured to output a first pulse signal, which returns to a low level after transitioning to the high level periodically depending on the period, to the first flip-flop, and
wherein the first flip-flop is set periodically in response to the first pulse signal.

10. The electronic device of claim 8, wherein the second conversion controller includes:
a booster configured to receive the first error voltage from the first conversion controller and to output a second error voltage by boosting the first error voltage;
a second comparator configured to output a second comparison signal having the high level when a voltage of the second current information is greater than the second error voltage; and
a second flip-flop configured to output the second control signal which is set periodically and is reset when the second comparison signal transitions to the high level.

11. The electronic device of claim 10, wherein the booster includes a resistor and a current source connected in series to a node of the first conversion controller, from which the first error voltage is output.

12. The electronic device of claim 8, wherein the first conversion controller further includes:
an impedance element connected between an output of the first amplifier and the ground node;
a first ramp signal generator configured to generate a first ramp signal periodically depending on the period;
a first operator configured to add the first ramp signal to the first current information and to output a result of the addition of the first ramp signal and the first current information to the comparator as the voltage of the first current information; and
a first pulse generator configured to output a first pulse signal, which returns to a low level after transitioning to the high level periodically depending on the period, to the first flip-flop, and
wherein the first flip-flop is set periodically in response to the first pulse signal.

13. The electronic device of claim 1, wherein the first current information is information of a current flowing through the first switch, and
wherein the second current information is information of a current flowing through the third switch.

14. An operating method of an electronic device which includes an inductor, a capacitor, a first switch and a second switch associated with buck conversion, and a third switch and a fourth switch associated with boost conversion, the method comprising:
- extracting first current information about the buck conversion from the first switch and extracting second current information about the boost conversion from the third switch;
- dividing an output voltage of an output node to generate a feedback voltage;
- generating a first control signal based on the first current information and the feedback voltage, the first control signal being set periodically and reset when the feedback voltage is lower than a first target level;
- generating a second control signal based on the second current information and the feedback voltage, the second control signal being set periodically and is reset when the feedback voltage is lower than a second target level;
- controlling the first, second, third, and fourth switches based on the first and second control signals such that the buck conversion is performed, in a first mode;
- controlling the first, second, third, and fourth switches based on the second current information such that the boost conversion is performed, in a third mode; and
- controlling the first, second, third, and fourth switches based on the first current information and the second current information such that buck-boost conversion is performed, in a second mode.

15. The method of claim 14, wherein the electronic device further comprises a fifth switch connected between an input node and an output node, and
wherein the method further comprises:
- controlling the first, second, third, fourth and fifth switches such that an input voltage of the input node is transferred as an output voltage of the output node, in a fourth mode.

16. The method of claim 14, further comprising:
wherein, in the first mode, the second mode, and the third mode, the first, second, third, and fourth switches are controlled further based on the feedback voltage.

17. The method of claim 14, further comprising:
selecting one of the first mode, the second mode, and the third mode based on an input voltage of an input node.

18. An electronic device comprising:
a direct voltage to direct voltage converter; and
a controller configured to control the direct voltage to direct voltage converter,
wherein the direct voltage to direct voltage converter includes:
- an inductor connected between a first node and a second node;
- a first switch connected between the first node and an input node;
- a second switch connected between the first node and a ground node;
- a third switch connected between the second node and the ground node;
- a fourth switch connected between the second node and an output node;
- a capacitor connected between the output node and the ground node; and
- resistors connected in series between the output node and the ground node, and configured to generate a feedback voltage smaller than an output voltage of the output node, and wherein the controller is configured to
- select a first mode when an input voltage of the input node is higher than a first level, to select a third mode when the input voltage is lower than a second level lower than the first level, and to select a second mode when the input voltage is equal to or lower than the first level and is equal to or higher than the second level; and
- control the first, second, third, and fourth switches based on a set and a reset of the first control signal such that buck conversion is performed, in the first mode, to control the first, second, third, and fourth switches based on a set and a reset of the second control signal such that boost conversion is performed, in the third mode, and to control the first, second, third, and fourth switches based on the set and the reset of the first control signal and the set and the reset of the second control signal such that buck-boost conversion is performed, in the second mode, and wherein the controller includes:
- a first conversion controller configured to output a first control signal which is set periodically and is reset when the feedback voltage is lower than a first target level; and
- a second conversion controller configured to output a second control signal which is set periodically and is reset when the feedback voltage is lower than a second target level.

19. The electronic device of claim 18, further comprising:
a fifth switch connected in parallel with the inductor,
wherein, in a fourth mode, the controller is configured to control the first, second, third, fourth, and fifth switches such that the input voltage is transferred to the output node.

* * * * *